(12) United States Patent
Leong et al.

(10) Patent No.: US 11,023,081 B2
(45) Date of Patent: *Jun. 1, 2021

(54) MULTI-FUNCTIONAL KEYBOARD ASSEMBLIES

(71) Applicant: Apple Inc., Cupertino, CA (US)

(72) Inventors: Craig C. Leong, San Jose, CA (US); James J. Niu, San Jose, CA (US); John M. Brock, San Francisco, CA (US); Keith J. Hendren, San Francisco, CA (US); Thomas W. Wilson, Jr., Saratoga, CA (US); Bartley K. Andre, Menlo Park, CA (US); Mikael Silvanto, San Francisco, CA (US); Dinesh C. Mathew, Fremont, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/290,624

(22) Filed: Mar. 1, 2019

(65) Prior Publication Data

US 2019/0196603 A1  Jun. 27, 2019

Related U.S. Application Data

(63) Continuation of application No. 15/649,840, filed on Jul. 14, 2017, now Pat. No. 10,254,851, which is a (Continued)

(51) Int. Cl.
*G06F 3/02* (2006.01)
*H01H 13/70* (2006.01)
(Continued)

(52) U.S. Cl.
CPC ............ *G06F 3/0443* (2019.05); *G06F 3/021* (2013.01); *G06F 3/0202* (2013.01); (Continued)

(58) Field of Classification Search
CPC ....... H01H 13/83; H01H 13/023–3/125; G06F 3/02
(Continued)

(56) References Cited

U.S. PATENT DOCUMENTS 3,657,492 A   4/1972  Arndt et al.
3,818,153 A   6/1974  Arvai
(Continued)

FOREIGN PATENT DOCUMENTS

CN   2155620 Y   2/1994
CN   2394309 Y   8/2000
(Continued)

OTHER PUBLICATIONS

International Search Report, PCT/US2013/066109, 4 pages, dated Dec. 12, 2013.
(Continued)

*Primary Examiner* — Vanessa Girardi
(74) *Attorney, Agent, or Firm* — Dorsey & Whitney LLP

(57) ABSTRACT

Multi-functional keyboard assemblies include an array of keys formed from stacked component layers. A top portion of the key may be capable of travelling vertically with respect to a base of the key. The top portion can include a keycap and a circuitry module coupled to the keycap. The keys may be capable of receive at least two distinct types of inputs and/or receiving at least one type of input and providing at least one type of output. Such output may include use of one or more light sources, displays, and/or haptic feedback devices.

21 Claims, 15 Drawing Sheets

Related U.S. Application Data continuation of application No. 14/058,316, filed on Oct. 21, 2013, now Pat. No. 9,710,069.

(60) Provisional application No. 61/720,366, filed on Oct. 30, 2012.

(51) Int. Cl.
 *G06F 3/044* (2006.01)
 *H01H 13/83* (2006.01)
 *G06F 3/023* (2006.01)

(52) U.S. Cl.
 CPC ........... *G06F 3/0238* (2013.01); *H01H 13/70* (2013.01); *H01H 13/83* (2013.01)

(58) Field of Classification Search
 USPC ......... 200/314, 344, 5 A, 310–313; 345/174, 345/168, 170
 See application file for complete search history.

(56) References Cited

U.S. PATENT DOCUMENTS

| | | |
|---|---|---|
| 3,917,917 A | 11/1975 | Murata |
| 3,978,297 A | 8/1976 | Lynn et al. |
| 4,095,066 A | 6/1978 | Harris |
| 4,319,099 A | 3/1982 | Asher |
| 4,349,712 A | 9/1982 | Michalski |
| 4,484,042 A | 11/1984 | Matsui |
| 4,596,905 A | 6/1986 | Fowler |
| 4,598,181 A | 7/1986 | Selby |
| 4,670,084 A | 6/1987 | Durand et al. |
| 4,755,645 A | 7/1988 | Naoki et al. |
| 4,937,408 A | 6/1990 | Hattori et al. |
| 4,987,275 A | 1/1991 | Miller et al. |
| 5,021,638 A | 6/1991 | Nopper et al. |
| 5,092,459 A | 3/1992 | Uljanic et al. |
| 5,136,131 A | 8/1992 | Komaki |
| 5,278,372 A | 1/1994 | Takagi et al. |
| 5,280,146 A | 1/1994 | Inagaki et al. |
| 5,340,955 A | 8/1994 | Calvillo et al. |
| 5,382,762 A | 1/1995 | Mochizuki |
| 5,397,867 A | 3/1995 | Demeo |
| 5,408,060 A | 4/1995 | Muurinen |
| 5,421,659 A | 6/1995 | Liang |
| 5,422,447 A | 6/1995 | Spence |
| 5,457,297 A | 10/1995 | Chen |
| 5,477,430 A | 12/1995 | LaRose et al. |
| 5,481,074 A | 1/1996 | English |
| 5,504,283 A | 4/1996 | Kako et al. |
| 5,512,719 A | 4/1996 | Okada et al. |
| 5,625,532 A | 4/1997 | Sellers |
| 5,769,210 A | 6/1998 | Tsai |
| 5,804,780 A | 9/1998 | Bartha |
| 5,828,015 A | 10/1998 | Coulon |
| 5,847,337 A | 12/1998 | Chen |
| 5,874,700 A | 2/1999 | Hochgesang |
| 5,875,013 A | 2/1999 | Takahara |
| 5,876,106 A | 3/1999 | Kordecki et al. |
| 5,878,872 A | 3/1999 | Tsai |
| 5,881,866 A | 3/1999 | Miyajima et al. |
| 5,898,147 A | 4/1999 | Domzalsi et al. |
| 5,924,555 A | 7/1999 | Sadamori et al. |
| 5,935,691 A | 8/1999 | Tsai |
| 5,960,942 A | 10/1999 | Thornton |
| 5,986,227 A | 11/1999 | Hon |
| 6,020,565 A | 2/2000 | Pan |
| 6,068,416 A | 5/2000 | Kumamoto et al. |
| 6,215,420 B1 | 4/2001 | Harrison et al. |
| 6,257,782 B1 | 7/2001 | Maruyama et al. |
| 6,259,046 B1 | 7/2001 | Iwama et al. |
| 6,377,685 B1 | 4/2002 | Krishnan |
| 6,388,219 B2 | 5/2002 | Hsu et al. |
| 6,423,918 B1 | 7/2002 | King et al. |
| 6,482,032 B1 | 11/2002 | Szu et al. |
| 6,530,283 B2 | 3/2003 | Okada et al. |
| 6,538,801 B2 | 3/2003 | Jacobson et al. |
| 6,542,355 B1 | 4/2003 | Huang |
| 6,552,287 B2 | 4/2003 | Janniere |
| 6,556,112 B1 | 4/2003 | Van Zeeland et al. |
| 6,559,399 B2 | 5/2003 | Hsu et al. |
| 6,560,612 B1 | 5/2003 | Yamada et al. |
| 6,572,289 B2 | 6/2003 | Lo et al. |
| 6,573,463 B2 | 6/2003 | Ono |
| 6,585,435 B2 | 7/2003 | Fang |
| 6,624,369 B2 | 9/2003 | Ito et al. |
| 6,648,530 B2 | 11/2003 | Kamei et al. |
| 6,706,986 B2 | 3/2004 | Hsu |
| 6,738,050 B2 | 5/2004 | Comiskey et al. |
| 6,750,414 B2 | 6/2004 | Sullivan |
| 6,759,614 B2 | 7/2004 | Yoneyama |
| 6,762,381 B2 | 7/2004 | Kunthady et al. |
| 6,788,450 B2 | 9/2004 | Kawai et al. |
| 6,797,906 B2 | 9/2004 | Ohashi |
| 6,850,227 B2 | 2/2005 | Takahashi et al. |
| 6,860,660 B2 | 3/2005 | Hochgesang et al. |
| 6,911,608 B2 | 6/2005 | Levy |
| 6,926,418 B2 | 8/2005 | Oestergaard et al. |
| 6,940,030 B2 | 9/2005 | Takeda et al. |
| 6,977,352 B2 | 12/2005 | Oosawa |
| 6,979,792 B1 | 12/2005 | Lai |
| 6,987,466 B1 | 1/2006 | Welch et al. |
| 6,987,503 B2 | 1/2006 | Inoue |
| 6,995,326 B2* | 2/2006 | Sugimura ............ H01H 25/008 200/4 |
| 7,012,206 B2 | 3/2006 | Oikawa |
| 7,030,330 B2 | 4/2006 | Suda |
| 7,038,832 B2 | 5/2006 | Kanbe |
| 7,126,499 B2 | 10/2006 | Lin et al. |
| 7,129,930 B1 | 10/2006 | Cathey et al. |
| 7,134,205 B2 | 11/2006 | Bruennel |
| 7,146,701 B2 | 12/2006 | Mahoney et al. |
| 7,151,236 B2 | 12/2006 | Ducruet et al. |
| 7,151,237 B2 | 12/2006 | Mahoney et al. |
| 7,154,059 B2 | 12/2006 | Chou |
| 7,166,813 B2 | 1/2007 | Soma |
| 7,172,303 B2 | 2/2007 | Shipman et al. |
| 7,189,932 B2 | 3/2007 | Kim |
| 7,256,766 B2 | 8/2007 | Albert et al. |
| 7,283,119 B2 | 10/2007 | Kishi |
| 7,301,113 B2 | 11/2007 | Nishimura et al. |
| 7,312,414 B2* | 12/2007 | Yatsu ................. H01H 3/125 200/344 |
| 7,312,790 B2 | 12/2007 | Sato et al. |
| 7,378,607 B2 | 5/2008 | Koyano et al. |
| 7,385,806 B2 | 6/2008 | Liao |
| 7,391,555 B2 | 6/2008 | Albert et al. |
| 7,414,213 B2 | 8/2008 | Hwang |
| 7,429,707 B2 | 9/2008 | Yanai et al. |
| 7,432,460 B2 | 10/2008 | Clegg |
| 7,510,342 B2 | 3/2009 | Lane et al. |
| 7,531,764 B1 | 5/2009 | Lev et al. |
| 7,541,554 B2 | 6/2009 | Hou |
| 7,589,292 B2 | 9/2009 | Jung et al. |
| 7,639,187 B2 | 12/2009 | Caballero et al. |
| 7,639,571 B2 | 12/2009 | Ishii et al. |
| 7,651,231 B2 | 1/2010 | Chou et al. |
| 7,674,992 B2 | 3/2010 | Hutchison et al. |
| 7,679,010 B2 | 3/2010 | Wingett |
| 7,724,415 B2 | 5/2010 | Yamaguchi |
| 7,781,690 B2 | 8/2010 | Ishii |
| 7,813,774 B2 | 10/2010 | Perez-Noguera |
| 7,842,895 B2 | 11/2010 | Lee |
| 7,847,204 B2 | 12/2010 | Tsai |
| 7,851,819 B2 | 12/2010 | Shi |
| 7,866,866 B2 | 1/2011 | Wahlstrom |
| 7,893,376 B2 | 2/2011 | Chen |
| 7,923,653 B2 | 4/2011 | Ohsumi |
| 7,944,437 B2 | 5/2011 | Imamura |
| 7,947,915 B2 | 5/2011 | Lee et al. |
| 7,999,748 B2 | 8/2011 | Ligtenberg et al. |
| 8,063,325 B2 | 11/2011 | Sung et al. |
| 8,077,096 B2 | 12/2011 | Chiang et al. |
| 8,080,744 B2 | 12/2011 | Yeh et al. |

(56) References Cited

U.S. PATENT DOCUMENTS

| | | |
|---|---|---|
| 8,098,228 B2 | 1/2012 | Shimodaira et al. |
| 8,109,650 B2 | 2/2012 | Chang et al. |
| 8,119,945 B2 | 2/2012 | Lin |
| 8,124,903 B2 | 2/2012 | Tatehata et al. |
| 8,134,094 B2 | 3/2012 | Tsao et al. |
| 8,143,982 B1 | 3/2012 | Lauder et al. |
| 8,156,172 B2 | 4/2012 | Muehl et al. |
| 8,178,808 B2 | 5/2012 | Strittmatter |
| 8,184,021 B2 | 5/2012 | Chou |
| 8,212,160 B2 | 7/2012 | Tsao |
| 8,212,162 B2 | 7/2012 | Zhou |
| 8,218,301 B2 | 7/2012 | Lee |
| 8,232,958 B2 | 7/2012 | Tolbert |
| 8,246,228 B2 | 8/2012 | Ko et al. |
| 8,253,048 B2 | 8/2012 | Ozias et al. |
| 8,253,052 B2 | 8/2012 | Chen |
| 8,263,887 B2 | 9/2012 | Chen et al. |
| 8,289,280 B2 | 10/2012 | Travis |
| 8,299,382 B2 | 10/2012 | Takemae et al. |
| 8,317,384 B2 | 11/2012 | Chung et al. |
| 8,319,129 B2 | 11/2012 | Nishino |
| 8,319,298 B2 | 11/2012 | Hsu |
| 8,325,141 B2 | 12/2012 | Marsden |
| 8,330,725 B2 | 12/2012 | Mahowald et al. |
| 8,354,629 B2 | 1/2013 | Lin |
| 8,378,857 B2 | 2/2013 | Pance |
| 8,383,972 B2 | 2/2013 | Liu |
| 8,384,566 B2 | 2/2013 | Bocirnea |
| 8,404,990 B2 | 3/2013 | Lutgring et al. |
| 8,431,849 B2 | 4/2013 | Chen |
| 8,436,265 B2 | 5/2013 | Koike et al. |
| 8,451,146 B2 | 5/2013 | Mahowald et al. |
| 8,462,514 B2 | 6/2013 | Myers et al. |
| 8,480,285 B2 | 7/2013 | Tan et al. |
| 8,500,348 B2 | 8/2013 | Dumont et al. |
| 8,502,094 B2 | 8/2013 | Chen |
| 8,542,194 B2 | 9/2013 | Akens et al. |
| 8,548,528 B2 | 10/2013 | Kim et al. |
| 8,564,544 B2 | 10/2013 | Jobs et al. |
| 8,569,639 B2 | 10/2013 | Strittmatter |
| 8,575,632 B2 | 11/2013 | Kuramoto et al. |
| 8,581,127 B2 | 11/2013 | Jhuang et al. |
| 8,592,699 B2 | 11/2013 | Kessler et al. |
| 8,592,702 B2 | 11/2013 | Tsai |
| 8,592,703 B2 | 11/2013 | Johnson et al. |
| 8,604,370 B2 | 12/2013 | Chao |
| 8,629,362 B1 | 1/2014 | Knighton et al. |
| 8,642,904 B2 | 2/2014 | Chiba et al. |
| 8,651,720 B2 | 2/2014 | Sherman et al. |
| 8,659,882 B2 | 2/2014 | Liang et al. |
| 8,695,211 B2 | 4/2014 | Hyuga et al. |
| 8,731,618 B2 | 5/2014 | Jarvis et al. |
| 8,748,767 B2 | 6/2014 | Ozias et al. |
| 8,759,705 B2 | 6/2014 | Funakoshi et al. |
| 8,760,405 B2 | 6/2014 | Nam |
| 8,779,308 B2 | 7/2014 | Takemae et al. |
| 8,786,548 B2 | 7/2014 | Oh et al. |
| 8,791,378 B2 | 7/2014 | Lan |
| 8,835,784 B2 | 9/2014 | Hirota |
| 8,847,089 B2 | 9/2014 | Fujibayashi |
| 8,847,090 B2 | 9/2014 | Ozaki |
| 8,847,711 B2 | 9/2014 | Yang et al. |
| 8,853,580 B2 | 10/2014 | Chen |
| 8,854,312 B2 | 10/2014 | Meierling |
| 8,870,477 B2 | 10/2014 | Merminod et al. |
| 8,884,174 B2 | 11/2014 | Chou et al. |
| 8,888,305 B2 | 11/2014 | Chen |
| 8,921,473 B1 | 12/2014 | Hyman |
| 8,922,476 B2 | 12/2014 | Stewart et al. |
| 8,943,427 B2 | 1/2015 | Heo et al. |
| 8,976,117 B2 | 3/2015 | Krahenbuhl et al. |
| 8,994,641 B2 | 3/2015 | Stewart et al. |
| 9,007,297 B2 | 4/2015 | Stewart et al. |
| 9,012,795 B2 | 4/2015 | Niu et al. |
| 9,024,214 B2 | 5/2015 | Niu et al. |
| 9,029,723 B2 | 5/2015 | Pegg |
| 9,063,627 B2 | 6/2015 | Yairi et al. |
| 9,064,642 B2 | 6/2015 | Welch et al. |
| 9,086,733 B2 | 7/2015 | Pance |
| 9,087,663 B2 | 7/2015 | Los |
| 9,093,229 B2 | 7/2015 | Leong et al. |
| 9,213,416 B2 | 12/2015 | Chen |
| 9,223,352 B2 | 12/2015 | Smith et al. |
| 9,234,486 B2 | 1/2016 | Das et al. |
| 9,235,236 B2 | 1/2016 | Nam |
| 9,274,654 B2 | 3/2016 | Slobodin et al. |
| 9,275,810 B2 | 3/2016 | Pance et al. |
| 9,300,033 B2 | 3/2016 | Han et al. |
| 9,305,496 B2 | 4/2016 | Kimura |
| 9,405,369 B2 | 8/2016 | Modarres et al. |
| 9,412,533 B2 | 8/2016 | Hendren et al. |
| 9,443,672 B2 | 9/2016 | Martisauskas |
| 9,448,628 B2 | 9/2016 | Tan et al. |
| 9,448,631 B2 | 9/2016 | Winter et al. |
| 9,449,772 B2 | 9/2016 | Leong et al. |
| 9,471,185 B2 | 10/2016 | Guard |
| 9,477,382 B2 | 10/2016 | Hicks et al. |
| 9,502,193 B2 | 11/2016 | Niu et al. |
| 9,612,674 B2 | 4/2017 | Degner et al. |
| 9,640,347 B2 | 5/2017 | Kwan et al. |
| 9,704,665 B2 | 7/2017 | Brock et al. |
| 9,704,670 B2 | 7/2017 | Leong et al. |
| 9,710,069 B2 | 7/2017 | Leong et al. |
| 9,715,978 B2 | 7/2017 | Hendren |
| 9,734,965 B2 | 8/2017 | Verdú Martínez et al. |
| 9,761,389 B2 | 9/2017 | Leong et al. |
| 9,793,066 B1 | 10/2017 | Brock et al. |
| 2002/0079211 A1 | 6/2002 | Katayama et al. |
| 2002/0093436 A1 | 7/2002 | Lien |
| 2002/0113770 A1 | 8/2002 | Jacobson et al. |
| 2002/0149835 A1 | 10/2002 | Kanbe |
| 2003/0169232 A1 | 9/2003 | Ito |
| 2004/0004559 A1 | 1/2004 | Rast |
| 2004/0225965 A1 | 11/2004 | Garside et al. |
| 2005/0035950 A1 | 2/2005 | Daniels |
| 2005/0071771 A1 | 3/2005 | Nagasawa et al. |
| 2005/0253801 A1 | 11/2005 | Kobayashi |
| 2006/0011458 A1 | 1/2006 | Purcocks |
| 2006/0020469 A1 | 1/2006 | Rast |
| 2006/0120790 A1 | 6/2006 | Chang |
| 2006/0181511 A1 | 8/2006 | Woolley |
| 2006/0243987 A1 | 11/2006 | Lai |
| 2007/0200823 A1 | 8/2007 | Bytheway et al. |
| 2007/0285393 A1 | 12/2007 | Ishakov |
| 2008/0131184 A1 | 6/2008 | Brown et al. |
| 2008/0136782 A1 | 6/2008 | Mundt et al. |
| 2008/0202824 A1 | 8/2008 | Philipp et al. |
| 2008/0251370 A1 | 10/2008 | Aoki |
| 2009/0046053 A1 | 2/2009 | Shigehiro et al. |
| 2009/0103964 A1 | 4/2009 | Takagi et al. |
| 2009/0128496 A1 | 5/2009 | Huang |
| 2009/0262085 A1 | 10/2009 | Wassingbo et al. |
| 2009/0267892 A1 | 10/2009 | Faubert |
| 2009/0295736 A1 | 12/2009 | Laurent et al. |
| 2009/0322568 A1 | 12/2009 | Yoshida |
| 2010/0045705 A1 | 2/2010 | Vertegaal et al. |
| 2010/0066568 A1 | 3/2010 | Lee |
| 2010/0109921 A1 | 5/2010 | Annerfors |
| 2010/0156796 A1 | 6/2010 | Kim et al. |
| 2010/0253630 A1 | 10/2010 | Homma et al. |
| 2011/0032127 A1 | 2/2011 | Roush |
| 2011/0043384 A1 | 2/2011 | Cheng |
| 2011/0056817 A1 | 3/2011 | Wu |
| 2011/0056836 A1 | 3/2011 | Tatebe et al. |
| 2011/0205179 A1 | 8/2011 | Braun |
| 2011/0261031 A1 | 10/2011 | Muto |
| 2011/0267272 A1 | 11/2011 | Meyer et al. |
| 2011/0284355 A1 | 11/2011 | Yang |
| 2012/0012446 A1 | 1/2012 | Hwa |
| 2012/0032972 A1 | 2/2012 | Hwang |
| 2012/0090973 A1 | 4/2012 | Liu |
| 2012/0098751 A1 | 4/2012 | Liu |
| 2012/0186965 A1 | 7/2012 | Zieder |
| 2012/0286701 A1 | 11/2012 | Yang et al. |

(56) References Cited

U.S. PATENT DOCUMENTS

| | | |
|---|---|---|
| 2012/0298496 A1 | 11/2012 | Zhang |
| 2012/0313856 A1 | 12/2012 | Hsieh |
| 2013/0043115 A1 | 2/2013 | Yang et al. |
| 2013/0093500 A1 | 4/2013 | Bruwer |
| 2013/0093684 A1 | 4/2013 | Wang et al. |
| 2013/0093733 A1 | 4/2013 | Yoshida |
| 2013/0100030 A1 | 4/2013 | Los et al. |
| 2013/0120265 A1 | 5/2013 | Horii et al. |
| 2013/0161170 A1 | 6/2013 | Fan et al. |
| 2013/0215079 A1 | 8/2013 | Johnson et al. |
| 2013/0242601 A1 | 9/2013 | Broer et al. |
| 2013/0270090 A1 | 10/2013 | Lee |
| 2014/0015777 A1 | 1/2014 | Park et al. |
| 2014/0027259 A1 | 1/2014 | Kawana et al. |
| 2014/0071654 A1 | 3/2014 | Chien |
| 2014/0082490 A1 | 3/2014 | Jung et al. |
| 2014/0090967 A1 | 4/2014 | Inagaki |
| 2014/0098042 A1 | 4/2014 | Kuo et al. |
| 2014/0151211 A1 | 6/2014 | Zhang |
| 2014/0184496 A1 | 7/2014 | Gribetz et al. |
| 2014/0191973 A1 | 7/2014 | Zellers et al. |
| 2014/0218851 A1 | 8/2014 | Klein et al. |
| 2014/0252881 A1 | 9/2014 | Dinh et al. |
| 2014/0291133 A1 | 10/2014 | Fu et al. |
| 2014/0375141 A1 | 12/2014 | Nakajima |
| 2015/0016038 A1 | 1/2015 | Niu et al. |
| 2015/0083561 A1 | 3/2015 | Han et al. |
| 2015/0227207 A1 | 8/2015 | Winter et al. |
| 2015/0270073 A1 | 9/2015 | Yarak, III et al. |
| 2015/0277559 A1 | 10/2015 | Vescovi et al. |
| 2015/0287553 A1 | 10/2015 | Welch et al. |
| 2015/0309538 A1 | 10/2015 | Zhang |
| 2015/0370339 A1 | 12/2015 | Ligtenberg et al. |
| 2015/0378391 A1 | 12/2015 | Huitema et al. |
| 2016/0049266 A1 | 2/2016 | Stringer et al. |
| 2016/0093452 A1 | 3/2016 | Zercoe et al. |
| 2016/0172129 A1 | 6/2016 | Zercoe et al. |
| 2016/0189890 A1 | 6/2016 | Leong et al. |
| 2016/0189891 A1 | 6/2016 | Zercoe et al. |
| 2016/0259375 A1 | 9/2016 | Andre et al. |
| 2016/0329166 A1 | 11/2016 | Hou et al. |
| 2016/0336124 A1 | 11/2016 | Leong et al. |
| 2016/0336127 A1 | 11/2016 | Leong et al. |
| 2016/0336128 A1 | 11/2016 | Leong et al. |
| 2016/0343523 A1 | 11/2016 | Hendren et al. |
| 2016/0351360 A1 | 12/2016 | Knopf et al. |
| 2016/0365204 A1 | 12/2016 | Cao et al. |
| 2016/0378234 A1 | 12/2016 | Ligtenberg et al. |
| 2016/0379775 A1 | 12/2016 | Leong et al. |
| 2017/0004939 A1 | 1/2017 | Kwan et al. |
| 2017/0011869 A1 | 1/2017 | Knopf et al. |
| 2017/0090104 A1 | 3/2017 | Cao et al. |
| 2017/0090106 A1 | 3/2017 | Cao et al. |
| 2017/0301487 A1 | 10/2017 | Leong et al. |
| 2018/0029339 A1 | 2/2018 | Niu et al. |
| 2018/0040441 A1 | 2/2018 | Wu et al. |
| 2018/0074694 A1 | 3/2018 | Lehmann et al. |
| 2018/0277319 A1* | 9/2018 | Carabelli ............... H01H 13/70 |

FOREIGN PATENT DOCUMENTS

| | | |
|---|---|---|
| CN | 1533128 A | 9/2004 |
| CN | 1542497 A | 11/2004 |
| CN | 2672832 Y | 1/2005 |
| CN | 1624842 A | 6/2005 |
| CN | 1812030 A | 8/2006 |
| CN | 1838036 A | 9/2006 |
| CN | 1855332 A | 11/2006 |
| CN | 101051569 A | 10/2007 |
| CN | 200961844 Y | 10/2007 |
| CN | 200986871 Y | 12/2007 |
| CN | 101146137 A | 3/2008 |
| CN | 201051315 Y | 4/2008 |
| CN | 201084602 Y | 7/2008 |
| CN | 201123174 Y | 9/2008 |
| CN | 201149829 Y | 11/2008 |
| CN | 101315841 A | 12/2008 |
| CN | 201210457 Y | 3/2009 |
| CN | 101438228 A | 5/2009 |
| CN | 101465226 A | 6/2009 |
| CN | 101494130 A | 7/2009 |
| CN | 101502082 A | 8/2009 |
| CN | 201298481 Y | 8/2009 |
| CN | 101546667 A | 9/2009 |
| CN | 101572195 A | 11/2009 |
| CN | 101800281 A | 8/2010 |
| CN | 101807482 A | 8/2010 |
| CN | 101868773 A | 10/2010 |
| CN | 201655616 U | 11/2010 |
| CN | 102110542 A | 6/2011 |
| CN | 102119430 A | 7/2011 |
| CN | 201904256 U | 7/2011 |
| CN | 102163084 A | 8/2011 |
| CN | 201927524 U | 8/2011 |
| CN | 201945951 U | 8/2011 |
| CN | 201945952 U | 8/2011 |
| CN | 201956238 U | 8/2011 |
| CN | 102197452 A | 9/2011 |
| CN | 202008941 U | 10/2011 |
| CN | 202040690 U | 11/2011 |
| CN | 102280292 A | 12/2011 |
| CN | 102338348 A | 2/2012 |
| CN | 102375550 A | 3/2012 |
| CN | 202205161 U | 4/2012 |
| CN | 102469527 A | 5/2012 |
| CN | 102496509 A | 6/2012 |
| CN | 102622089 A | 8/2012 |
| CN | 102629526 A | 8/2012 |
| CN | 202372927 U | 8/2012 |
| CN | 102679239 A | 9/2012 |
| CN | 102683072 A | 9/2012 |
| CN | 202434387 U | 9/2012 |
| CN | 202523007 U | 11/2012 |
| CN | 102832068 A | 12/2012 |
| CN | 102955573 A | 3/2013 |
| CN | 102956386 A | 3/2013 |
| CN | 102969183 A | 3/2013 |
| CN | 103000417 A | 3/2013 |
| CN | 103165327 A | 6/2013 |
| CN | 103180979 A | 6/2013 |
| CN | 203012648 U | 6/2013 |
| CN | 203135988 U | 8/2013 |
| CN | 103377841 A | 10/2013 |
| CN | 103489986 A | 1/2014 |
| CN | 203414880 U | 1/2014 |
| CN | 103681056 A | 3/2014 |
| CN | 103699181 A | 4/2014 |
| CN | 203520312 U | 4/2014 |
| CN | 203588895 U | 5/2014 |
| CN | 103839715 A | 6/2014 |
| CN | 103839720 A | 6/2014 |
| CN | 103839722 A | 6/2014 |
| CN | 103903891 A | 7/2014 |
| CN | 103956290 A | 7/2014 |
| CN | 203733685 U | 7/2014 |
| CN | 104021968 A | 9/2014 |
| CN | 204102769 U | 1/2015 |
| CN | 204117915 U | 1/2015 |
| CN | 104517769 A | 4/2015 |
| CN | 204632641 U | 9/2015 |
| CN | 105097341 A | 11/2015 |
| DE | 2530176 A1 | 1/1977 |
| DE | 3002772 A1 | 7/1981 |
| DE | 29704100 U1 | 4/1997 |
| DE | 202008001970 U1 | 5/2008 |
| EP | 0441993 A1 | 8/1991 |
| EP | 1835272 A1 | 9/2007 |
| EP | 1928008 A1 | 6/2008 |
| EP | 2202606 A2 | 6/2010 |
| EP | 2426688 A1 | 3/2012 |
| EP | 2439760 A1 | 4/2012 |
| EP | 2463798 A1 | 6/2012 |
| EP | 2664979 A1 | 11/2013 |
| FR | 2147420 A5 | 3/1973 |

(56) References Cited

FOREIGN PATENT DOCUMENTS

| | | |
|---|---|---|
| FR | 2911000 A1 | 7/2008 |
| FR | 2950193 A1 | 3/2011 |
| GB | 1361459 A | 7/1974 |
| JP | S50115562 U | 9/1975 |
| JP | S60055477 | 3/1985 |
| JP | S61172422 U | 10/1986 |
| JP | S62072429 | 4/1987 |
| JP | S63182024 U | 11/1988 |
| JP | H0422024 U | 2/1992 |
| JP | H0520963 U | 3/1993 |
| JP | H0524512 U | 3/1993 |
| JP | H05342944 A | 12/1993 |
| JP | H09204148 A | 8/1997 |
| JP | H10312726 A | 11/1998 |
| JP | H11194882 A | 7/1999 |
| JP | 2000010709 A | 1/2000 |
| JP | 2000057871 A | 2/2000 |
| JP | 2000339097 A | 12/2000 |
| JP | 2001100889 A | 4/2001 |
| JP | 2002260478 A | 9/2002 |
| JP | 2002298689 A | 10/2002 |
| JP | 2003114751 A | 4/2003 |
| JP | 2003522998 A | 7/2003 |
| JP | 2005108041 A | 4/2005 |
| JP | 2006164929 A | 6/2006 |
| JP | 2006185906 A | 7/2006 |
| JP | 2006521664 A | 9/2006 |
| JP | 2006269439 A | 10/2006 |
| JP | 2006277013 A | 10/2006 |
| JP | 2006344609 A | 12/2006 |
| JP | 2007115633 A | 5/2007 |
| JP | 2007514247 A | 5/2007 |
| JP | 2007156983 A | 6/2007 |
| JP | 2008021428 A | 1/2008 |
| JP | 2008041431 A | 2/2008 |
| JP | 2008100129 A | 5/2008 |
| JP | 2008191850 A | 8/2008 |
| JP | 2008533559 A | 8/2008 |
| JP | 2008293922 A | 12/2008 |
| JP | 2009099503 A | 5/2009 |
| JP | 2009181894 A | 8/2009 |
| JP | 2010061956 A | 3/2010 |
| JP | 2010244088 A | 10/2010 |
| JP | 2010244302 A | 10/2010 |
| JP | 2011018484 A | 1/2011 |
| JP | 2011065126 A | 3/2011 |
| JP | 2011150804 A | 8/2011 |
| JP | 2011165630 A | 8/2011 |
| JP | 2011524066 A | 8/2011 |
| JP | 2011187297 A | 9/2011 |
| JP | 2012022473 A | 2/2012 |
| JP | 2012043705 A | 3/2012 |
| JP | 2012063630 A | 3/2012 |
| JP | 2012098873 A | 5/2012 |
| JP | 2012134064 A | 7/2012 |
| JP | 2012186067 A | 9/2012 |
| JP | 2012230256 A | 11/2012 |
| JP | 2014017179 A | 1/2014 |
| JP | 2014026807 A | 2/2014 |
| JP | 2014216190 A | 11/2014 |
| JP | 2014220039 A | 11/2014 |
| JP | 2016023778 A | 2/2016 |
| KR | 1019990007394 | 1/1999 |
| KR | 1020020001668 | 1/2002 |
| KR | 100454203 B1 | 10/2004 |
| KR | 1020060083032 | 7/2006 |
| KR | 20080064116 A | 7/2008 |
| KR | 1020080066164 | 7/2008 |
| KR | 2020110006385 | 6/2011 |
| KR | 1020120062797 | 6/2012 |
| KR | 1020130040131 | 4/2013 |
| KR | 20150024201 A | 3/2015 |
| TW | 200703396 A | 1/2007 |
| TW | M334397 U | 6/2008 |
| TW | 201108284 A | 3/2011 |
| TW | 201108286 A | 3/2011 |
| TW | M407429 U | 7/2011 |
| TW | 201246251 A | 11/2012 |
| TW | 201403646 A | 1/2014 |
| WO | 9744946 A1 | 11/1997 |
| WO | 2005057320 A2 | 6/2005 |
| WO | 2006022313 A1 | 3/2006 |
| WO | 2007049253 A2 | 5/2007 |
| WO | 2008045833 A1 | 4/2008 |
| WO | 2009005026 A1 | 1/2009 |
| WO | 2012011282 A1 | 1/2012 |
| WO | 2012027978 A1 | 3/2012 |
| WO | 2013096478 A2 | 6/2013 |
| WO | 2014175446 A1 | 10/2014 |

OTHER PUBLICATIONS

Elekson, "Reliable and Tested Wearable Electronics Embedment Solutions", http://www.wearable.technology/our-technologies, at least as early as Jan. 6, 2016, 3 pages.

* cited by examiner

MULTI-FUNCTIONAL KEYBOARD ASSEMBLIES

CROSS-REFERENCE TO RELATED APPLICATIONS

This application is a continuation patent application of U.S. patent application Ser. No. 15/649,840, filed Jul. 14, 2017 and titled "Keyboard Key Employing a Capacitive Sensor and Dome," which is a continuation patent application of U.S. patent application Ser. No. 14/058,316, filed Oct. 21, 2013 and titled "Flexible Printed Circuit Having Flex Tails Upon Which Keyboard Keycaps are Coupled", now U.S. Pat. No. 9,710,069, issued Jul. 18, 2017, which claims the benefit of and priority to U.S. Provisional Patent Application No. 61/720,366, filed Oct. 30, 2012 and titled "Systems and Methods for Providing Multi-Functional Keyboard Assemblies," the disclosures of which are hereby incorporated herein in their entireties.

TECHNICAL FIELD

This can relate to systems and methods for providing multi-functional keyboard assemblies and, more particularly, to systems and methods for providing multi-functional keystacks for keyboard assemblies of electronic devices.

BACKGROUND

Electronic devices, such as desktop computers, laptops, netbooks, and tablets, typically include one or more user input mechanisms that facilitate interaction between a user and the electronic device. Such user input mechanisms include keyboards, mice, joysticks, and the like. Keyboards conventionally include an array of keys that are formed from stacked or layered components. Each keystack in such keyboards is often only able to perform one simple task, such as providing input to the electronic device, when a user presses the key.

SUMMARY

Multi-functional keystacks for electronic devices are disclosed. Multi-functional keystacks can improve the functionality of keyboard keys in a variety of ways. For instance, besides being configured with an first independent input component for providing a specific first input to an electronic device when pressed by a user, a multi-functional keystack can include a second independent input component that can provide a second distinct input to the electronic device and/or an independent output component that can provide an independent visual feedback to the user.

According to some embodiments, each multi-functional keystack can include a keycap, a circuitry module coupled to the keycap, a support mechanism, and a base. The components of the circuitry can include, for example, a light guide panel ("LGP"), at least one light source, a flexible circuit board ("flex"), and/or a switch. The base may support the other components of the keystack, and may be operably coupled to a housing of the keyboard and/or the electronic device.

The keycap, which can be at least partially transparent, may be coupled to the top of the support mechanism, which can support the keycap above the base and can allow the keycap to travel vertically relative to the base (e.g., for activating/deactivating a mechanical switch that may provide a key-stack specific input for the electronic device). Furthermore, the circuitry module may be coupled to the keycap such that the circuitry module can also travel vertically with the keycap relative to the base. In some embodiments, a flex may be incorporated into the circuitry module, and a flex tail may extend from the flex to permit communication between the circuitry module and one or more various system components that may be located external to the keystack (e.g., one or more processors of the electronic device).

According to some embodiments, the circuitry module that may be included in each keystack may include an electronic visual display ("display"). The electronic visual display may fully replace, or be disposed above or below, other circuitry components (e.g., an LGP) of the circuitry module. The display may be operably coupled to a top side of a flex such that a user can view information presented on the display through a transparent section of the keycap. Additionally or alternatively, the circuitry module of one or more keystacks may include a capacitive sensor for sensing single or multi-touch gestures provided by a user on each key or across multiple keys of the keyboard. The capacitive sensor may be stacked beneath one or more other circuitry components of the circuitry module (e.g., above or below an LGP).

In some embodiments, the keycap can be a rigid and durable material that may be made thinner than typical keyboard keycaps for reducing the overall thickness of the keystack. For example, the keycap may be formed from glass. Thus, the rigid and durable keycap can be thinner and stronger than traditional keycaps while also providing desired transparency characteristics (e.g., for passing light therethrough from an LGP of the keystack) and/or providing desired conductivity (e.g., for enabling capacitive sensing of a sensor of the keystack). Various sub-structures can be included to support and retain the rigid and durable keycap within the keystack.

BRIEF DESCRIPTION OF THE DRAWINGS

The above and other aspects of the invention, its nature, and various features will become more apparent upon consideration of the following detailed description, taken in conjunction with the accompanying drawings, in which like reference characters may refer to like parts throughout, and in which:

FIGS. 13A and 13B show perspective views of a portion of a key 1300 in accordance with some embodiments.

DETAILED DESCRIPTION

Figure 1:
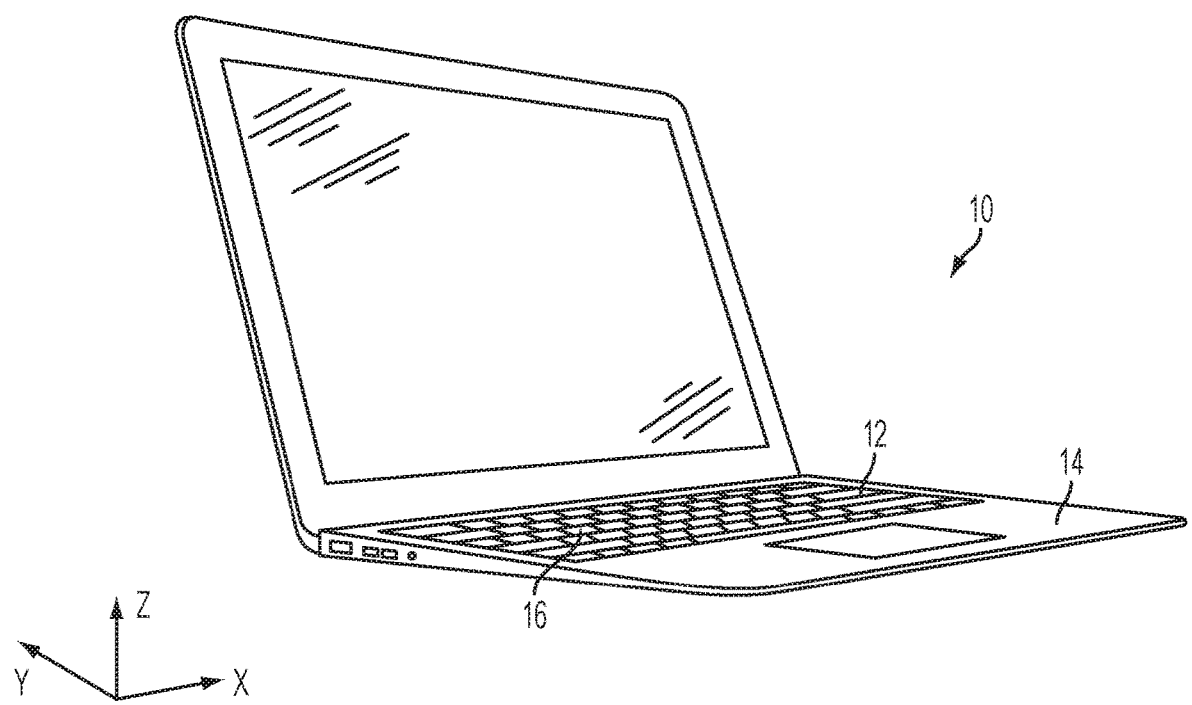
FIG. 1 is a perspective view of an electronic device with a keyboard assembly in accordance with some embodiments.

Some embodiments disclosed herein may take the form of a keyboard assembly for an electronic device or computing device. The keyboard assembly may transfer user input to the electronic device and may include an array of keys, buttons, and/or switches that may represent different inputs to the electronic device. For example, each of the keys may include a glyph. As used herein, a glyph can be a legend or symbol (e.g., one or more alphanumeric symbols and/or words) that may be visible on and/or through a keycap of the key. The corresponding input can be initiated within the electronic device when the key is pressed or otherwise actuated. The keyboard may be in communication with the electronic device and can be integrated with or external to the electronic device. In some embodiments, the keyboard may be operably connected to an enclosure of the electronic device.

Additionally, each key of the keyboard can include dedicated circuitry that may be independently addressable by one or more processors of the electronic device. Thus, the functionality of each key can be significantly increased over the functionality of conventional keyboard keys. For example, each key may be capable of providing independent visual and/or tactile information to the user and/or receiving independent tactile information from the user. Additional input modes may also be facilitated that can take advantage of the independently addressable circuitry of each key.

A top portion of the keystack for each key of the keyboard may include the keycap, which may be accessible to the user from the outside of the keyboard, and a circuitry module coupled to the keycap. In some embodiments, the circuitry module can include one or more light sources (e.g., one or more LEDs) and an LGP coupled to a top side of a flex, between the flex and the keycap. Additionally or alternatively, a switch (e.g., a compressible dome switch) may be coupled to a bottom side of the flex. A flex tail may extend from a main portion of the flex and can be communicatively coupled to the flex portion of the circuitry module that may be coupled to a bottom portion of the keycap for bidirectional transmission of signals between components of the keystack and one or more processors of the electronic device coupled to the keyboard.

The bottom portion of the keystack may be fixed in an X-Y plane beneath and parallel to the keycap. The bottom portion may include a feature plate mounted on a base. The base may be a rigid, planar surface that may span the entirety or a subset of the keyboard assembly. In some embodiments, the base may be the housing of the keyboard assembly or of the entire electronic device. Like the base, the feature plate may span the entirety or a subset of the keyboard. For example, each keystack may include a separate feature plate coupled to the base or every keystack of the entire keyboard may share a single feature plate. The feature plate can include anchor features for engaging and retaining anchor portions of a support mechanism included within each keystack. In some embodiments, the feature plate and base may be a single, unitary component.

The support mechanism can be any suitable mechanism for facilitating vertical movement of the keycap with respect to the feature plate (e.g., along the Z-axis). For example, the support mechanism can be a "scissor" or a "butterfly" support mechanism that may evenly translate pressure on the keycap into vertical motion of the top portion of the keystack towards the bottom portion of the keystack. According to various embodiments, features can be included on the keycap and/or the circuitry module (e.g., the LGP) for coupling to the support mechanism. Some of these features may permit transmission of light emitted from a light source of the circuitry module to the outer perimeter of the keystack to generate a halo effect around the keycap.

The bottom portion of each keystack may further include one or more flex circuits coupled to the feature plate and/or base. Each flex circuit may facilitate bidirectional communication between the processor(s) of the electronic device and each keystack of the keyboard (e.g., the circuitry module of each keystack). In some embodiments, a single flex circuit can be shared by each keystack of the keyboard, with a portion of the flex circuit dedicated to each keystack and communicatively coupled to the rest of the flex circuit with a flex tail. The bottom portion of each keystack may be capped and protected from the environment with an enclosure stacked above each flex circuit. The enclosure may be physically coupled to the flex circuits (e.g., with an adhesive) or, alternatively, the enclosure may lie on top of or float over the flex circuits.

According to some embodiments, a glyph that is visible on or through the keycap can be static and illuminated by one or more light sources included within the keystack. For example, an LGP that may be included within a keystack may include one or more apertures that may permit propagation of light emitted from the light sources in predefined patterns up through the keycap. Accordingly, the glyph can be illuminated through the keycap by light emitted from the light sources and propagated through the LGP. Additionally or alternatively, the LGP may diffuse the light emitted from the light sources. In still further embodiments, allowing light to selectively propagate through transparent sections of the keycap can result in an illuminated static glyph.

A glyph visible on or through a keycap of a key may also be dynamic. In some embodiments, dynamic glyphs can be generated using multiple light sources and filters of a circuitry module within the keystack. For example, a first glyph (e.g., a capital 'A') can be generated using a first light source that may emit light at a first wavelength (e.g., at a red wavelength), and a second glyph (e.g., a lower case 'a') can be generated using a second light source that may emit light at a second wavelength (e.g., at a blue wavelength). One or more filters can be included to selectively allow light to propagate from each of the light sources to illuminate the desired glyph. Switching between the two light sources can result in the first or second glyph being illuminated. A display included within the keystack may also be used to generate dynamic glyphs.

In some embodiments, the circuitry module of a keystack can include a sensing component that may be configured to sense when a user has selected or depressed the key. The sensing component may be located on the bottom surface of a flex of the circuitry module and may be arranged to interact with a switch of the keystack. For example, the switch can be a compressible dome switch that may interact with the sensing component when the key is depressed (e.g., in along the Z-axis towards the base and/or feature plate. The sensing component can relay a signal that they key has been depressed through the flex and ultimately to one or more processors of an electronic device coupled to the keyboard.

Additionally or alternatively, the circuitry module of a keystack can include a sensing member that may be configured to detect changes in capacitance. In some embodiments, such a sensing member may include a capacitive sensor that can be positioned within the keystack to detect when a user has touched or come close to touching the top surface of the keycap (e.g., along the X-Y plane of the keycap, as opposed to detecting when a user has depressed the key along the Z-axis). In such embodiments, the keyboard may be able to detect any or all of: the keycap approaching the base; varying forces applied to the keycap; and the position and/or presence of one or more user fingers on the various keycaps. The capacitive sensors included in each keystack may be further configured to transmit a single or multi-touch gesture instruction to the processor(s) of the electronic device, thereby potentially obviating the need for additional input mechanisms, such as, for example, a separate mouse, trackball, trackpad, or touchscreen.

Turning to the figures and as described above, the keyboard may be incorporated within an electronic device. FIG. 1 is a perspective view of an electronic device 10 including a keyboard assembly 12. Electronic device 10 may be any type of electronic device such as, for example, a laptop computer, a desktop computer, a tablet, a server, a smart telephone, or a portable gaming device. Additionally, it should be noted that although keyboard assembly 12 may be shown as integrated within electronic device 10 in FIG. 1, keyboard assembly 12 may be separate from, and communicatively coupled to, electronic device 10. For example, keyboard assembly 12 may be a self-contained, standalone unit that can include a communication device (e.g., a cable or wireless interface) for transferring data to and from electronic device 10.

In some embodiments, device 10 may further include an enclosure 14 that may surround keyboard assembly 12. Enclosure 14 can define multiple apertures, each of which can receive a key 16 of keyboard assembly 12. However, in other embodiments, enclosure 14 may define a single aperture or fewer apertures than the number of keys, such that all keys 16 may be received within a single aperture or groups of keys 16 may be received through a single aperture.

Keys 16 may be of varying sizes and/or shapes. Additionally, each one of keys 16 may include a glyph visible on or through a top surface of a keycap. For example, the symbol (not shown) for each key 16 may be painted, etched, or illuminated through an aperture or transparent portion of the keycap of key 16. Each key 16 may represent one or more different inputs, and depressing a key may provide an input associated with that key to a processor or other component of device 10. For example, each key 16 can include a sensor to detect when it is depressed, and the sensor may transmit a signal to a processor within device 10 indicating that key 16 has been depressed or otherwise actuated. In other embodiments, as key 16 is depressed, it may complete a switch circuit indicating that the key has been selected.

Figure 2:
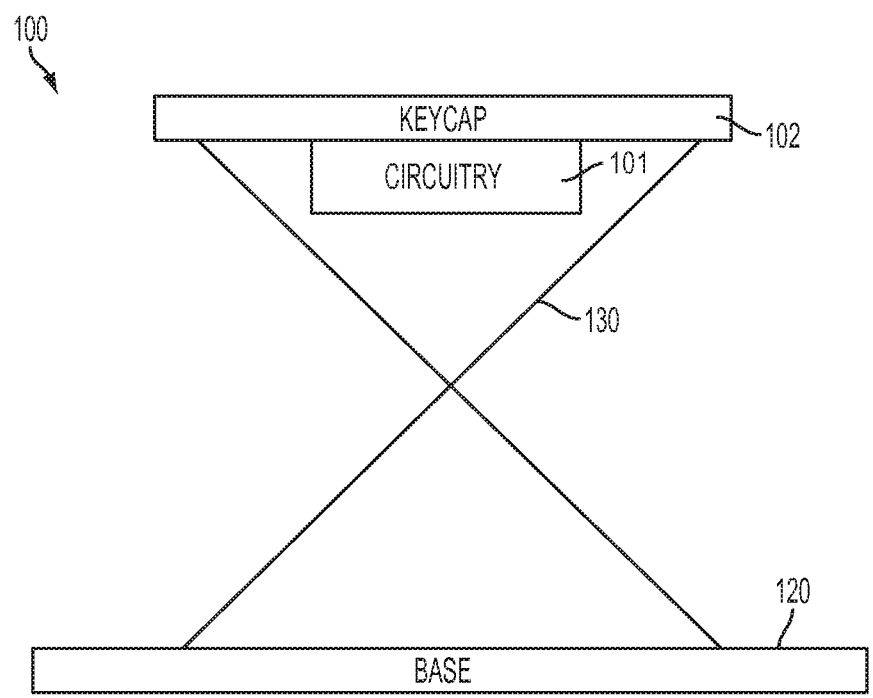
FIG. 2 is a schematic cross-sectional view of a keystack in accordance with some embodiments.

FIG. 2 is a schematic cross-sectional view of a keystack 100 in accordance with some embodiments. Keystack 100 may correspond, for example, to a key 16 of FIG. 1 and can include a circuitry module 101, a keycap 102, a base 120, and a support mechanism 130. When pressure is applied to the top surface of keycap 102 (e.g., in the −Z-direction), support mechanism 130 can facilitate vertical movement of both circuitry module 101 and keycap 102 (e.g., in the −Z-direction towards base 120). That is, circuitry module 101 and keycap 102 can travel together in a direction perpendicular to the plane of base 120 while being supported by support mechanism 130. According to various embodiments, circuitry module 101 can be any suitable electronic circuitry that may include components such as, for example, a rigid or flexible printed circuit board ("PCB"), a mechanical switch, a light source, a light guide panel, an electronic visual display, and/or a capacitive sensor. One skilled in the art will appreciate that circuitry module 101 can represent any suitable electronic circuitry component or any suitable combination of electronic circuitry components.

Figure 3:
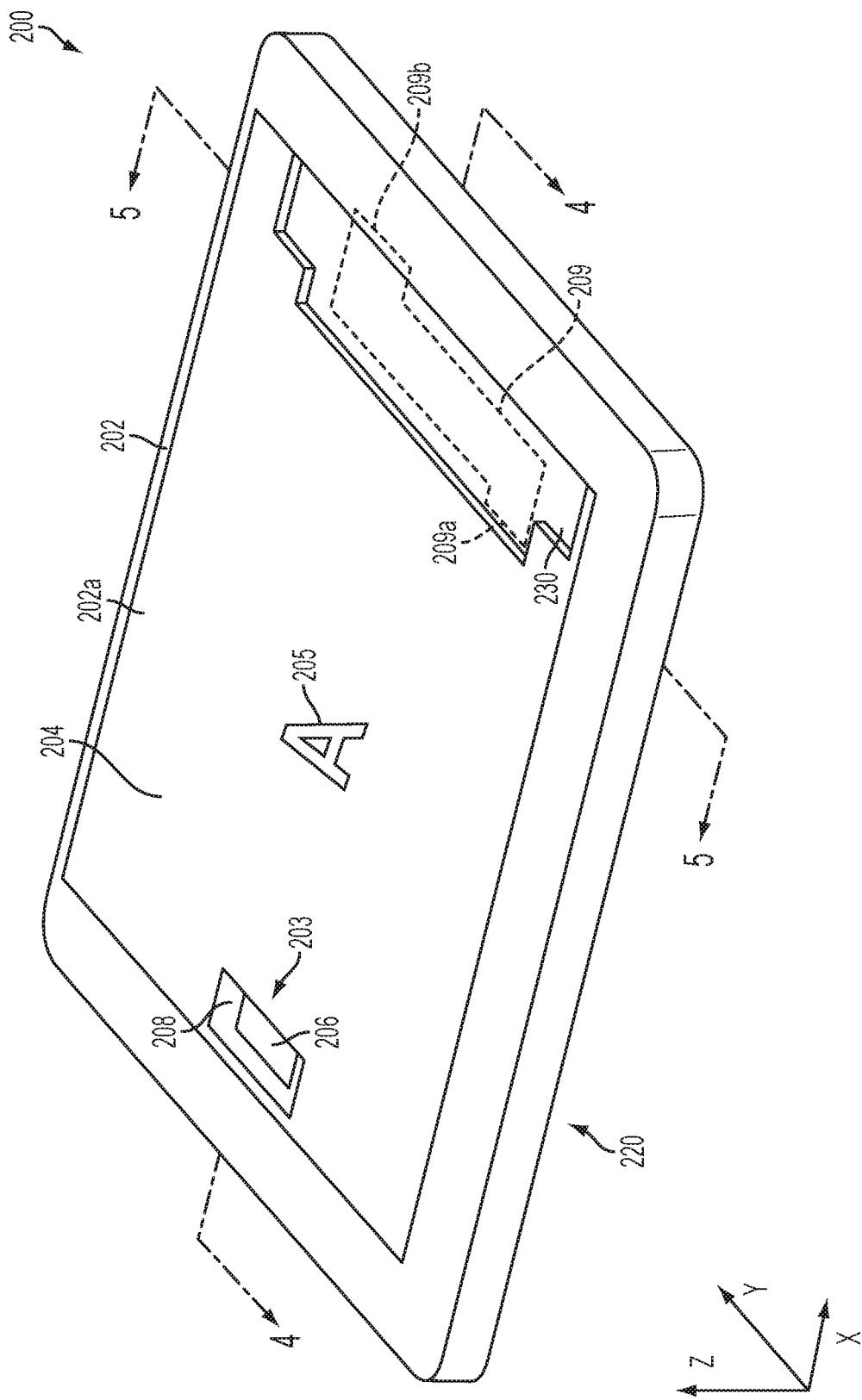
FIG. 3 is a top perspective view of a keystack in accordance with some embodiments.

FIGS. 3-7 show a keystack 200 in accordance with some embodiments. FIG. 3 is a perspective view of keystack 200 in accordance with some embodiments. Keystack 200 can include a keycap 202, a base 220, a supporting mechanism 230, and a circuitry module that may include an LGP 204, a light source 206, and a flex 208 that may include a flex tail 209. The components of the circuitry module may correspond to circuitry module 101 of FIG. 2.

Keycap 202 can be at least partially transparent to allow light emitted from light source 206 and/or transmitted through LGP 204 to be visible through the top side 202a of keycap 202. Thus, keycap 202 may be an at least semi-transparent material such as, for example, a glass or a plastic. As described with respect to FIGS. 9A-11, for example, keycap 202 may include features, or may be coupled to a subassembly that can include features, for coupling to support mechanism 230. For example, keycap 202 (or a subassembly coupled to keycap 202) can include a series of hooks, clasps, or other suitable features for engaging coupling features of support mechanism 230. Furthermore, keycap 202 may have beveled, chamfered, rounded, or other suitably shaped edges.

According to some embodiments, at least a portion of keycap 202 may be opaque to block light emitted from light source 206, LGP 204, and/or any other component of keystack 200. For example, as depicted in FIG. 3, light source 206 can be co-planer with and disposed in a cutout of LGP 204. If the portion of keycap 202 above light source 206 is not opaque, light emitted from light source 206 could propagate directly through keycap 202, thus limiting the proportion of light that is directed through LGP 204, which may result in a potentially undesirable direct view of light source 206.

Accordingly, an outer periphery of keycap 202 may be made opaque using paint, for example. The opaque portion of keycap 202 may extend from the edges of keycap 202 at least up to the portion of keycap 202 that may be positioned directly over LGP 204. A person skilled in the art will appreciate, however, that any suitable portion of keycap 202 may be opaque. As one example, an opaque portion of keycap 202 may extend along the portion of keycap 202 that is positioned directly along the sides of LGP 204 in order to prevent light from leaking out at the edges of LGP 204. As another example, the entire surface of keycap 202 may be opaque except for specially shaped apertures (e.g., apertures that define glyphs to be illuminated through keycap 202).

LGP 204 can be any suitable component for redirecting and/or modifying light emitted from light source 206. According to some embodiments, LGP 204 can include a plate for dispersing light emitted by light source 206. Dispersing the light emitted by light source 206 can create the impression of a light source that has the dimensions of LGP 204, with the emitted light being evenly spread over the surface area of LGP 204. Thus, a pleasing, evenly emitted light source can be generated in keystack 200 even if only one light source 206 is provided. A highly dispersive LGP 204 may provide even emission of light even if light source 206 is off center, as shown in FIG. 3. A highly dispersed light source may be advantageous for backlighting one or more components of keystack 200 (e.g., keycap 202).

At least a portion of circuitry module 101 of keystack 200 (e.g., LGP 204) can be physically coupled to keycap 202. According to some embodiments, LGP 204 may be directly coupled to keycap 202 with an adhesive, such as, for example, a thermoplastic pressure-sensitive adhesive ("PSA"). The adhesive used may be transparent to the wavelength of light generated by light source 206 such that the light profile emitted from LGP 204 and striking a bottom side of keycap 202 may be controlled by the properties of LGP 204. That is, light emitted from LGP 204 may pass through the adhesive without being appreciably altered. In other embodiments, attributes of the adhesive, including, but not limited to, the thickness and color, may be chosen to further alter the light emitted by LGP 204 and striking the bottom side of keycap 202.

LGP 204 may also include one or more apertures 205 for allowing propagation of light without significant dispersion. The apertures may be any suitable portions of LGP 204 that may be transparent to light generated by light source 206. According to various embodiments, the apertures may be physical apertures cut, machined, or otherwise removed from LGP 204. Such apertures may extend fully or partially through LGP 204 depending on the desired light profile. For example, for a sharply delineated light profile, the physical apertures may extend all the way through LGP 204, while apertures that extend only partially through LGP 204 may give a softer, more diffuse light profile. The light profile generated by an LGP including apertures may result in illuminated glyphs that may be visible through keycap 202.

In other embodiments, apertures in LGP 204 can be formed from a material that may be transparent to light at the wavelength generated by light source 206. That is, LGP 204 may be formed from two different materials, one that may block or diffuses light generated from light source 206 and one that may be transparent to light generated from light source 206. A dual-material LGP may be formed by removing material from a homogeneous LGP (e.g., by machining or sawing) and filling those areas with a second material.

Light source 206 may be any type of light source (e.g., an LED, a LASER, an incandescent lamp, or a gas discharge lamp). However, due to space constraints, LEDs may be the most appropriate choice. Furthermore, LEDs are inexpensive, easy to mount onto flexible circuit boards, and may be capable of emitting light in a wide range of colors.

As depicted in FIG. 3, light source 206 can be mounted on a top surface of flex 208 and may be disposed in a cutout 203 formed in LGP 204. Cutout 203 in LGP 204 can help to reduce the total thickness of keystack 200 by allowing light source 206 to be arranged roughly co-planar with LGP 204, rather than stacking light source 206 and LGP 204 in separate layers. In some embodiments, flex 208 can be directly coupled to the bottom side of LGP 204. If the portion of keycap 202 layered directly above light source 206 is opaque, the light emitted from light source 206 can be directed into LGP 204 and redirected and manipulated as described above.

According to some embodiments, two or more light sources 206 may be provided, each with a different wavelength for illuminating different glyphs in keycap 202. Two or more filters may also be provided for selectively blocking light emitted from the light sources 206. As one particular example, a first light source may emit red light, and a second light source may emit blue light. A first filter layered within keystack 200 (e.g., between LGP 204 and keycap 202) may be configured to block red light but allow blue light to propagate; and a second filter may be layered within keystack 200 (e.g., between the first filter and keycap 202) that may be configured to block blue light but allow red light to propagate. An aperture included within the first filter may allow red light to selectively propagate through the first filter. The light can then pass through the second filter and to the bottom surface of keystack 200, thus illuminating a glyph formed using the aperture in the first filter. Similarly, blue light emitted from the second light source can propagate through the first filter, and an aperture included within the second filter may allow blue light to selectively propagate through the second filter, thus illuminating a glyph formed using the aperture in the first filter.

Flex 208 may be a flexible printed circuit board that may include one or more mounting points for various components (e.g., light source 206) of circuitry module 101 of keystack 200 and conductive traces for routing signals between those components. The conductive traces may also route signals between components mounted on flex 208 and components within a keyboard (e.g., keyboard 12 of FIG. 1) and/or an electronic device communicatively coupled to the keyboard (e.g., electronic device 10 of FIG. 1). Conductive traces may be formed on flex 208 using any suitable materials (e.g., Cu or Au metal foil). Because flexes can be considerably thinner than traditional rigid PCBs, incorporating a flex into keystack 200 can significantly decrease the overall thickness of the key.

Furthermore, flex 208 can be part of an upper portion of keystack 200 that may travel vertically (e.g., along the z-axis) with respect to base 220, which may remain fixed with respect to the remainder of a keyboard assembly (e.g., in an x-y plane). Thus, a main portion of flex 208 can be fixedly coupled to one or more components of the upper portion of keystack 200 (e.g., LGP 204 and/or keycap 202 and/or an upper portion of support mechanism 230). Flex 208 may be coupled to these components in any suitable manner including, for example, with an adhesive (e.g., PSA), solder joints, or mechanical fasteners (e.g., hooks, clasps, screws, or rivets).

Flex tail 209 may be a portion of flex 208 that may extend away at a first end from the main portion of flex 208 and that may not be fixedly coupled to any other component of the movable upper portion of keystack 200 at a second end. Instead, flex tail 209 may extend from flex 208 to one or more components of a lower portion of keystack 200 that may be fixed (e.g., in an X-Y plane), such as base 220. Thus, as flex 208 may travels vertically along with the upper portion of keystack 200 (e.g., along with keycap 202 and along with other portions of circuitry module 101, such as LGP 204 and light source 206), a first end 209a of flex tail 209 may be coupled to flex 208 such that first end 209a can also travel vertically, while a second end 209b of flex tail 209 may be coupled to a bottom portion of keystack 200 that may remain fixed. Flex tail 209 can include one or more conductive traces for routing signals from components in the upper portion of keystack 200 to the lower portion of keystack 200.

Flex tail 209 can extend in any suitable direction from the main portion of flex 208. As one example and as depicted in FIG. 3, flex tail 209 may extend perpendicularly from one side of flex 208, make two 90° bends, and extend perpendicularly to one side of base 220. Such an embodiment may be advantageous, as it may reduce bunching of flex tail 209 as the top portion of keystack 200 travels vertically (e.g., such that tail 209 may extend along the z-axis as the top portion of keystack 200 is moved vertically). Therefore, the overall thickness required to house flex tail 209 within keystack 200 may be reduced. As another example, flex tail 209 may extend perpendicularly from the main portion of flex 208, form a loop, and extend perpendicularly to one side of base 220. One skilled in the art will appreciate that other arrangements of flex tail 209 within keystack 200 may be possible to enable extension of tail 209 along the Z-axis to permit vertical movement of the top portion of keystack 200 with respect to the bottom portion of keystack 200.

The upper portion of keystack 200 (e.g., keycap 202 and circuitry module 101 (e.g., LGP 204, light source 206, and flex 208)) can be supported by a top portion of support mechanism 230. Support mechanism 230 can support the upper portion of keystack 200 over base 220 with a switch positioned within a cavity 250 (shown and discussed below with respect to FIGS. 4-6) that may be defined by support mechanism 230. According to various embodiments, the switch may be provided by circuitry module 101 (see e.g., FIG. 4 below in which switch 210 is coupled to the bottom surface of flex 208) or the switch may be coupled to a portion of base 220 underlying flex 208 (see, e.g., FIG. 12 below).

Support mechanism 230 is discussed in more detail below with respect to FIG. 4. Briefly, a top portion of support mechanism 230 may be operably coupled to the movable top portion of keystack 200 (e.g., to keycap 202 and/or circuitry module 101) and a bottom portion of support mechanism 230 may be operably coupled to the fixed bottom portion of keystack 200 (e.g., to base 220). Support mechanism 230 can translate the upper portion of keystack 200 vertically downward in response to a downward force on keycap 202 and/or vertically upward in response to the termination of a downward force on keycap 202. In some embodiments, support mechanism 230 may be operably coupled to a bottom surface of keycap 202, LGP 204, or any other suitable mounting point of the upper portion of keystack 200, such that as a force is exerted on keycap 202, the force may also be transferred to support mechanism 230. Additionally, support mechanism 230 may attach to base 220 using one or more anchoring members (not shown). Thus, support mechanism 230 may move vertically, with its lateral motion substantially restricted.

Any suitable structure may be used to provide support mechanism 230. One example can be a scissor mechanism created out of a rigid material as disclosed in U.S. Patent Ser. No. 61/578,687, which is incorporated herein in its entirety. A second example can be a butterfly mechanism.

In some embodiments, as the upper portion of keystack 200 can be operably coupled to base 220 (e.g., via support mechanism 230 and flex tail 209), base 220 may operably couple keystack 200 to enclosure 240. Base 220 may include a base plate 222 for supporting multiple keystacks within a keyboard assembly. A feature plate 224 can be coupled to a top surface of base plate 222 and can include one or more anchoring members that may secure a bottom portion of support mechanism 230 to base 220. In still further embodiments, base 220 may be formed from a feature plate that may be shared over all or a portion of the keyboard assembly, and the other components of keystack 200 can be physically coupled to base 220 with an adhesive such as, for example, PSA.

Figure 4:
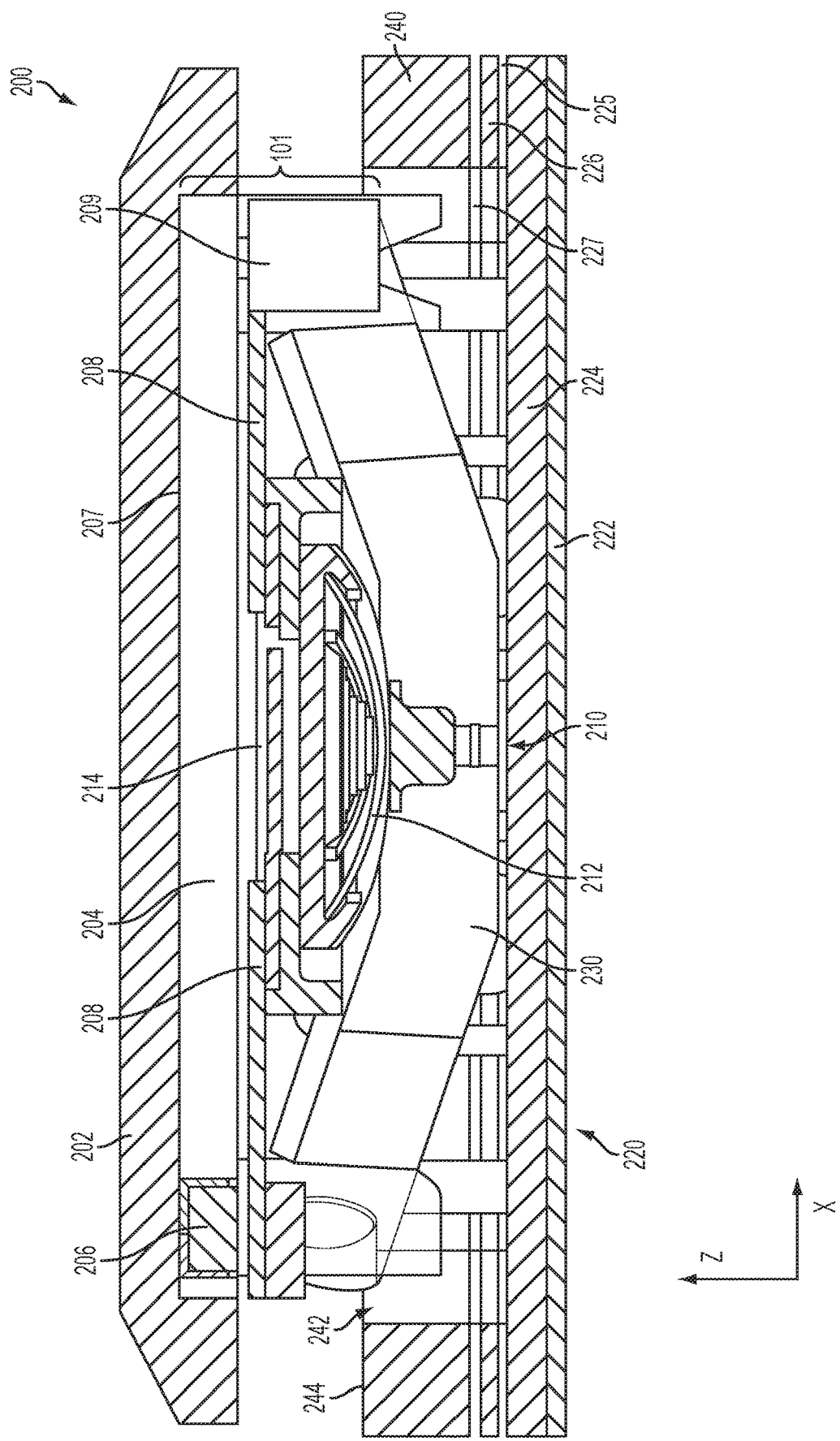
FIG. 4 is a cross-sectional view of the keystack of FIG. 3 in accordance with some embodiments.

FIG. 4 is a cross-sectional view of keystack 200 taken along the line 4-4 of FIG. 3 in accordance with some embodiments. In particular, FIG. 4 depicts keycap 202 coupled to LGP 204 with an adhesive 207 (e.g., PSA), LGP 204 and light source 206 operably coupled to flex 208, and flex tail 209 operably coupled between flex 208 and base 220. Additionally, FIG. 4 depicts a generic support mechanism 230 that may be layered between the upper portion of keystack 200 and base 220.

As depicted in FIG. 4, an enclosure 240 may define a key aperture 242 in which enhanced keystack 200 may be positioned. The dimensions of key aperture 242 can be slightly smaller than the dimensions of keycap 202, such that keycap 202 may overlap at least a portion of enclosure 240. In other embodiments, key aperture 242 can be slightly larger than keystack 200 such that keystack 200, including keycap 202, may be free to move vertically within key aperture 242. In some embodiments, keystack 200 may have a resting or normal position where keycap 202 may be positioned even with or slightly higher than a top surface 244 of enclosure 240. As a user depresses keycap 202 of keystack 200 (e.g., in the −z-direction), the upper portion of keystack 200 may translate downward with respect to top surface 244 of enclosure 240.

Also depicted in FIG. 4 may be a switch 210, which can be operably coupled to the bottom side of flex 208. Switch 210 may be provided by circuitry module 101 and may be any type of device capable of providing input to keystack 200 in response to the user downwardly moving keycap 202. In some embodiments, switch 210 can include a compressible dome 212 that may be bonded or otherwise coupled to the bottom side of flex 208. For example, compressible dome 212 may mechanically compress between flex 208 and another portion of keystack 200 (e.g., base 220 or base plate 222) as the user provides a downward force on keycap 202. In further embodiments, switch 210 may be operably coupled to base 220 as described below with respect to FIG. 12.

A second, distinct mode of input may be provided with a capacitive sensor included within circuitry 101, which may sense input when the top of keycap 202 is merely touched or swiped. Such embodiments are described in more detail below with respect to FIG. 10.

According to some embodiments, switch 210 can be operably connected to a sensor membrane layer 214 of circuitry module 101. In these embodiments, switch 210 can provide an input to sensor membrane 214 that may indicate that keystack 200 has been selected 20 (e.g., depressed). For example, switch 210 may complete a circuit or switch within sensor membrane 214 when keycap 202 is depressed by a user. In additional or alternative embodiments, switch 210 may be in communication with a sensing member that can detect changes in position of switch 210. In some embodiments, switch 210 can also provide haptic feedback to the user, such as, for example, by providing an increased resistance, a click, or a vibration when compressed.

Figure 5:
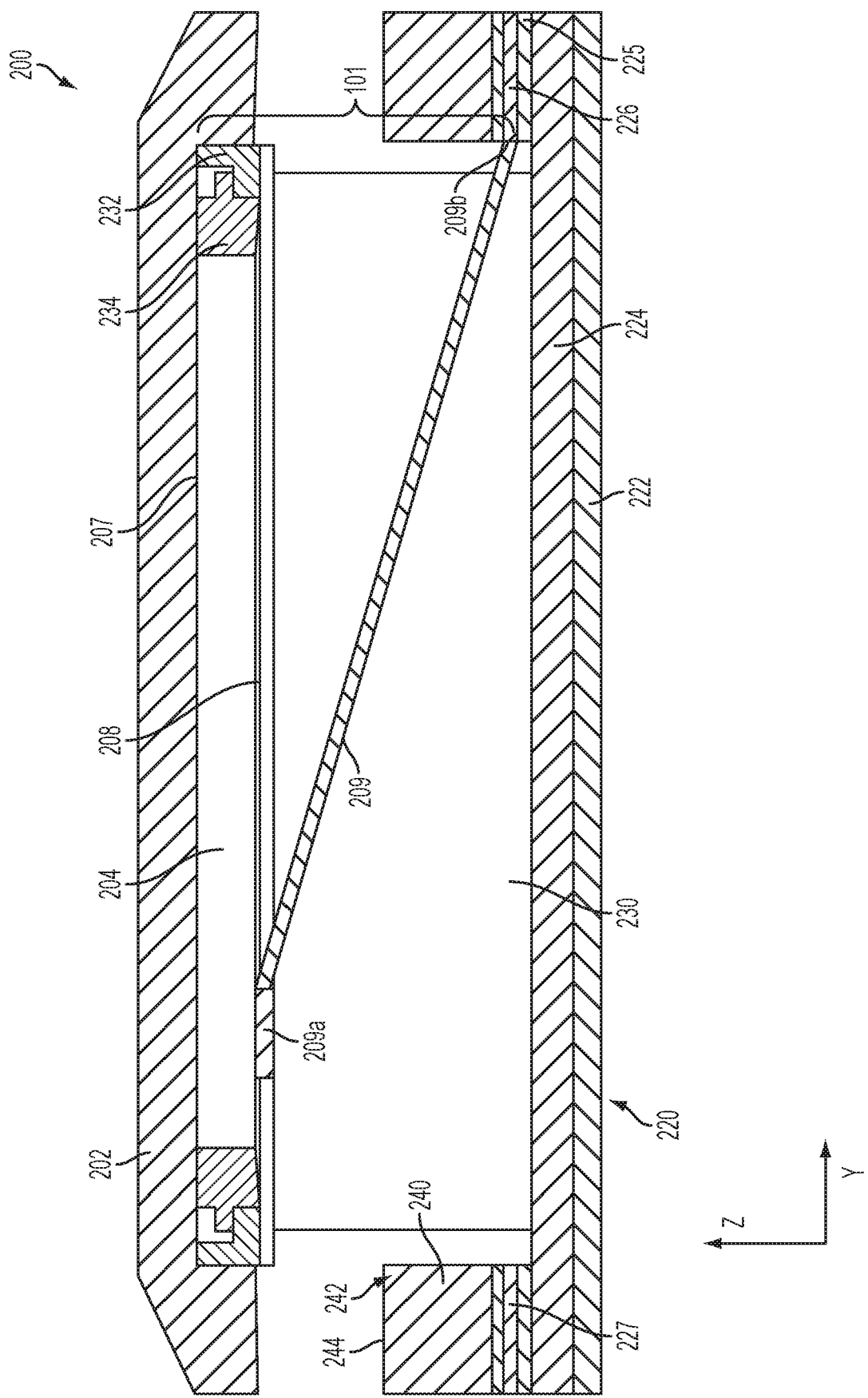
FIG. 5 is a second cross-sectional view of the keystack of FIG. 3 in accordance with some embodiments.

FIG. 5 is a cross-sectional view of keystack 200 taken along the line 5-5 of FIG. 3 in accordance with some embodiments. In particular, FIG. 5 depicts keycap 202 coupled to LGP 204 with an adhesive 207 (e.g., PSA), LGP 204 operably coupled to flex 208, and flex tail 209 operably coupled between flex 208 and base 220. Additionally, FIG. 4 depicts a generic support mechanism 230 that may be coupled to anchoring features 232 of keystack 200 with corresponding anchoring mechanisms 234. Because flex tail 209 is a flexible material, the top portion of keystack 200, including keycap 202, LGP 204, flex 208, anchoring features 232, and anchoring mechanisms 234, can travel vertically (i.e., in the z-direction with respect to base 220.

Figure 6:
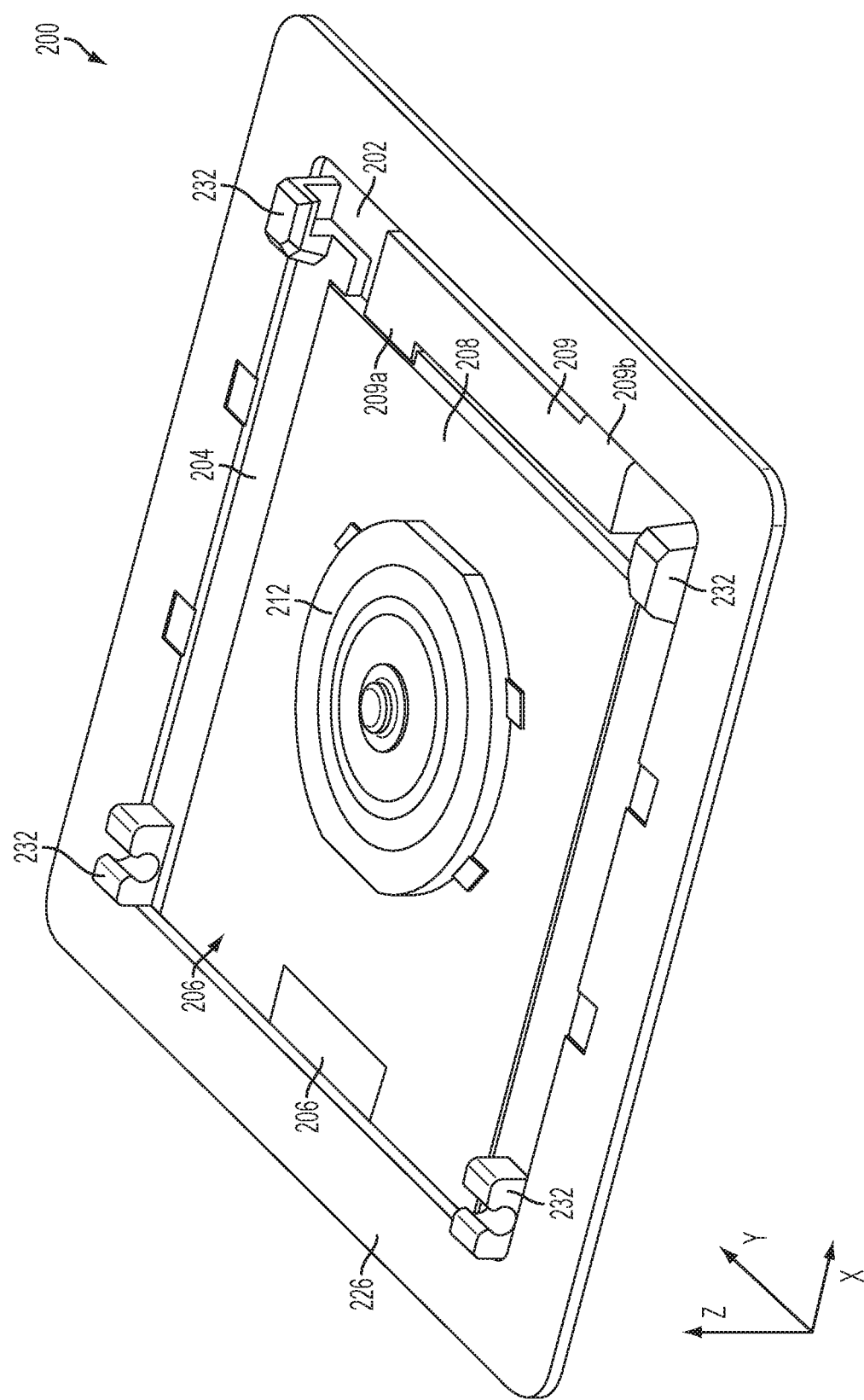
FIG. 6 is a perspective view of the bottom side of the upper portion of the keystack of FIGS. 3-5 in accordance with some embodiments.

FIG. 6 is a perspective view of the bottom side of the upper portion of keystack 200 in accordance with some embodiments. As shown, switch 210 may be mounted on the bottom side of the main portion of flex 208, light source 206 and LGP 204 may be mounted on the top side of the main portion of flex 208, and flex tail 209 may extend from the main portion of flex 208 to a frame 226 (e.g., frame 226 may be a portion of fixed base 220). A portion of keycap 202, which can be fixedly coupled to LGP 204 or any other suitable portion of circuitry module 101 with an adhesive, for example, may also be shown in FIG. 6.

Flex tail 209 may be operably coupled to frame 226 with any suitable combination of fasteners (e.g., screws or rivets), adhesives (e.g., PSA), and/or electrical connections (e.g., solder joints). Thus, second end 209b of flex tail 209 can be both fixedly coupled and communicatively/electrically coupled to frame 226. In turn, frame 226 may include conductive traces for routing signals to and from flex 208 via conductive traces in flex tail 209.

According to some embodiments, frame 226 may include conductive traces for routing signals between the keystack and components outside of the keyboard (e.g., between flex 208 of circuitry module 101 of each keystack and one or more processor(s) of an electronic device that uses the keyboard assembly). In some embodiments, each keystack 200 may include its own frame 226, which may be directly electrically coupled to one or more processors of an electronic device.

Figure 7:
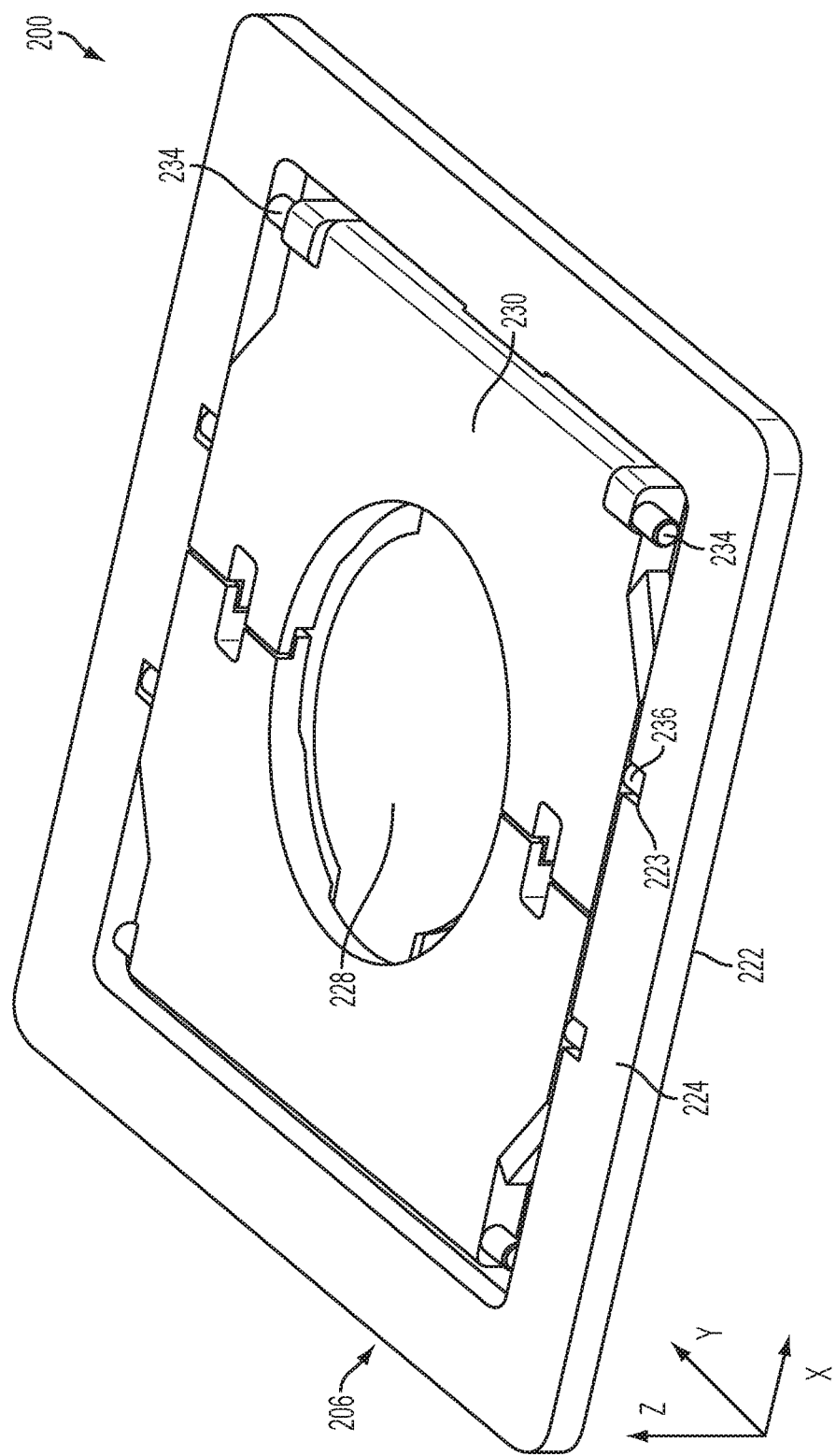
FIG. 7 is a perspective view of the bottom portion of the keystack of FIGS. 3-6 in accordance with some embodiments.

Alternatively, frame 226 can be a portion of a flex circuit that may extend over a portion or the entirety of a keyboard assembly, such that each one of two or more distinct keystacks 200 may be electrically coupled to the same frame 226 (e.g., via its own tail 209), and such a shared frame 226 may electrically couple all of those distinct keystacks 200 to one or more shared processors, which may be positioned within keyboard assembly 212 or elsewhere within electronic device 10 (e.g., as described in more detail below with respect to FIG. 7). In some embodiments, flex 208, flex tail 209, and frame 226 may all be portions of the same integrally formed flex circuit, and frame 226 may have the same or a similar shape as enclosure 240 of FIG. 3. Additionally, frame 226 may be physically coupled to the enclosure with an adhesive (e.g., adhesive 227 of FIG. 4).

LGP 204 or any other portion of circuitry module 101 may include one or more anchoring features 232 for anchoring corresponding anchoring members of a support mechanism (e.g., support mechanism 230 of FIG. 2) to the upper portion of keystack 200. Anchoring features 232 may take any suitable form depending on the nature and positioning of the anchoring members of the support mechanism. As depicted in FIG. 6, anchoring features 232 may be configured to support anchoring members at each of the four corners of LGP 204. In some embodiments, anchoring members 232 can be integrally formed with LGP 204 or any other portion of circuitry module 101 and/or any portion of keycap 202. However, one skilled in the art will appreciate that anchoring members 232 may be formed separately and physically coupled to LGP 204 or another component of keystack 200 (e.g., keycap 202).

FIG. 7 is a top perspective view of the bottom portion of keystack 200 in accordance with some embodiments. In particular, FIG. 7 depicts base 220 including feature plate 224 mounted above base plate 222. Feature plate 224 may be coupled to base plate 222 in any suitable manner including adhesives (e.g., PSA) and/or fasteners (e.g., screws or rivets).

Keystack 200 may also include a bias plate 228, which can provide a sturdy surface in the fixed base 220 that may allow switch 210 to be activated through support mechanism 230 when keycap 202 is depressed. In some embodiments, bias plate 228 may be an integrally formed portion of base plate 220. In other embodiments, however, bias plate 228 may be a separately formed structure that is fixedly coupled to a portion of base 220 with any suitable combination of fasteners and adhesives. Alternatively, switch 210 may be coupled to a portion of base 220 (e.g., bias plate 228, feature plate 224, and/or base plate 222) and may be engaged by the bottom of circuitry module 101 or any other suitable portion of the movable top portion of keystack 200 when keycap 202 is depressed.

Feature plate 224 can include a number of anchor features 223 configured to engage and retain anchor members 236 of a lower portion of support mechanism 230. In the embodiment depicted in FIG. 7, support mechanism 230 may be a butterfly-type support mechanism with two wings that may rotate about anchor members 236 with anchor features 223 of feature plate 224 as keycap 202 of keystack 200 is depressed and released. Support mechanism 230 may also include anchor members 234 at an upper portion of support mechanism 230 for engaging anchoring features 232 of LGP 204 (as shown in FIG. 5) or of keycap 202 or of any other suitable component of the top portion of keystack 200 (not shown).

Figure 8:
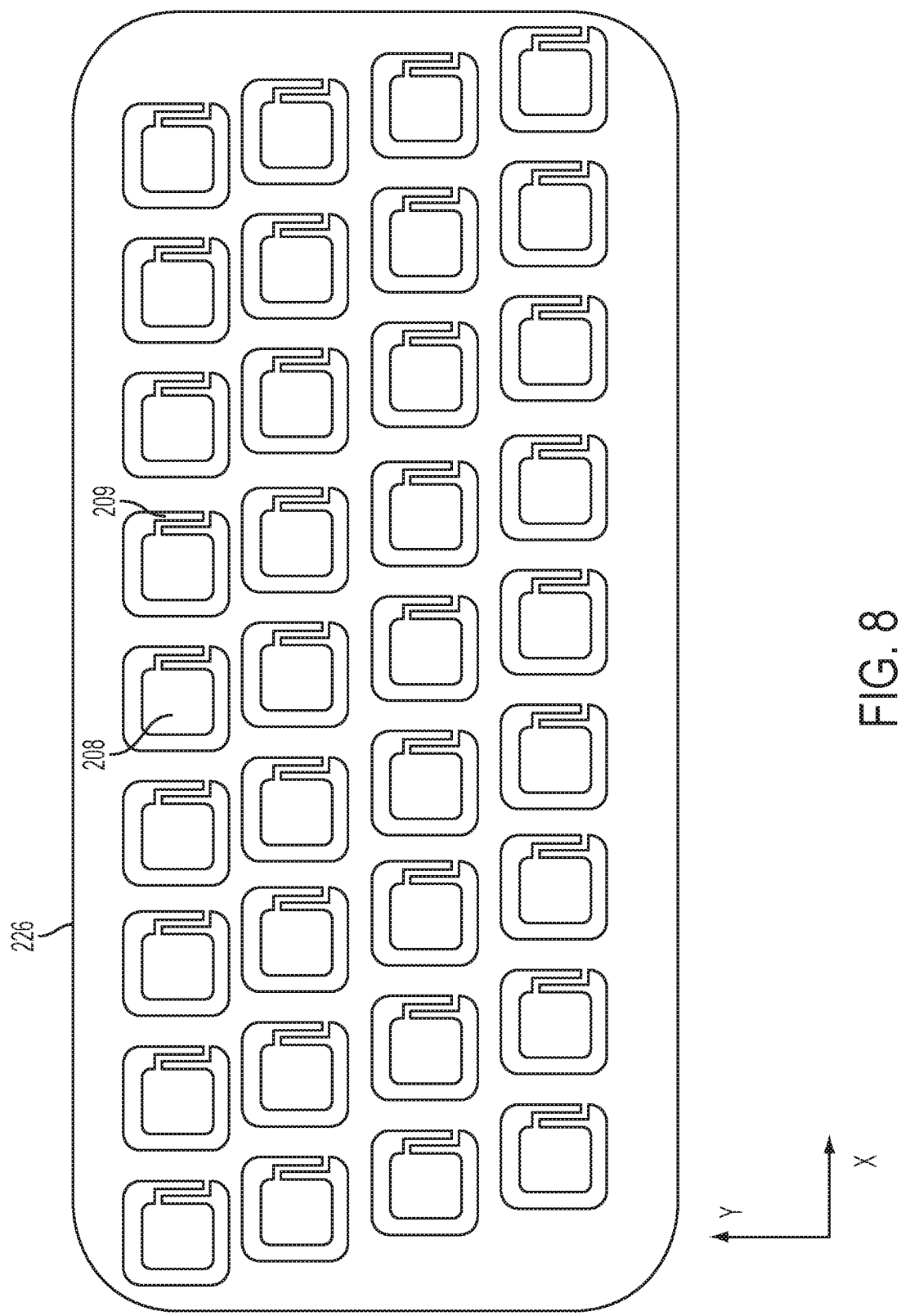
FIG. 8 is a top plan view of a frame in accordance with some embodiments.

FIG. 8 is a top plan view of frame 226 in accordance with some embodiments. Frame 226 can be a flex that spans the entirety of a keyboard (e.g., keyboard 12 of FIG. 1) and facilitates connectivity between individual keys of the keyboard and external circuitry (e.g., one or more processors of an electronic device). Frame 226 can include conductive traces that allow electrical connection to an array of keys of the keyboard. Each key can include a keystack, of which flex 208 can be a part. Flex 208 of each keystack may be coupled to the main portion of frame 226 via flex tail 209. In other embodiments, frame 226, flex 208, and flex tail 209 need not be integrally formed. For example, each keystack can include a separate flex 208 and flex tail 209, and frame 226 can be an independent circuit (e.g., a PCB) electrically and physically coupled to flex 208 via flex tail 209 using, for example, solder joints. The top side of frame 226 may be coupled to enclosure 240 with adhesive 227, while the bottom side of frame 226 may be coupled to feature plate 224 with adhesive 225.

Figure 9:
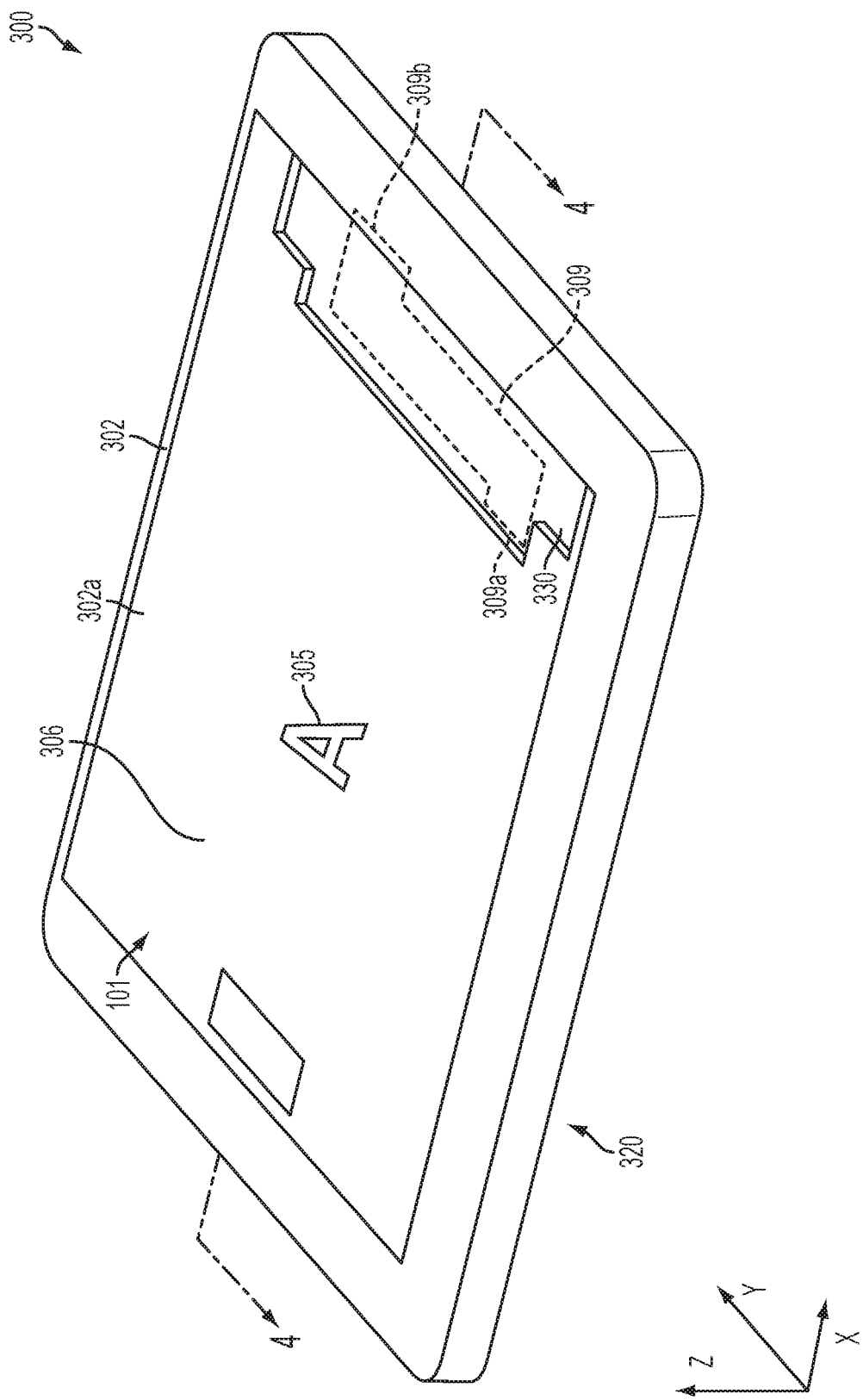
FIG. 9 is a perspective view of a keystack in accordance with some embodiments.

FIG. 9 is a perspective view of keystack 300 in accordance with some embodiments. Keystack 300 may be similar to keystack 200 with the exception of circuitry module 101. That is, circuitry module 101 of FIG. 9 can include a display 306 coupled to the top side of flex 308. Display 306 may be any suitable display type including, for example, an organic light emitting diode ("OLED") display, an LED display, a liquid crystal display ("LCD"), a plasma display, an electronic ink display ("e-ink"), or any other suitable thin film display. Keystack 300 can further include a keycap 302, a base 320, and a supporting mechanism 330, which may correspond to keycap 202, base 220, and supporting mechanism 230 of FIG. 3.

Display 306 may be capable of displaying glyph 305. As will be appreciated by one skilled in the art, however, display 306 may be capable of displaying any renderable image or series of images. Thus, display 306 can display dynamic glyphs, images, movie clips, etc. to a user based upon input from a processor coupled to display 306, for example.

Figure 10:
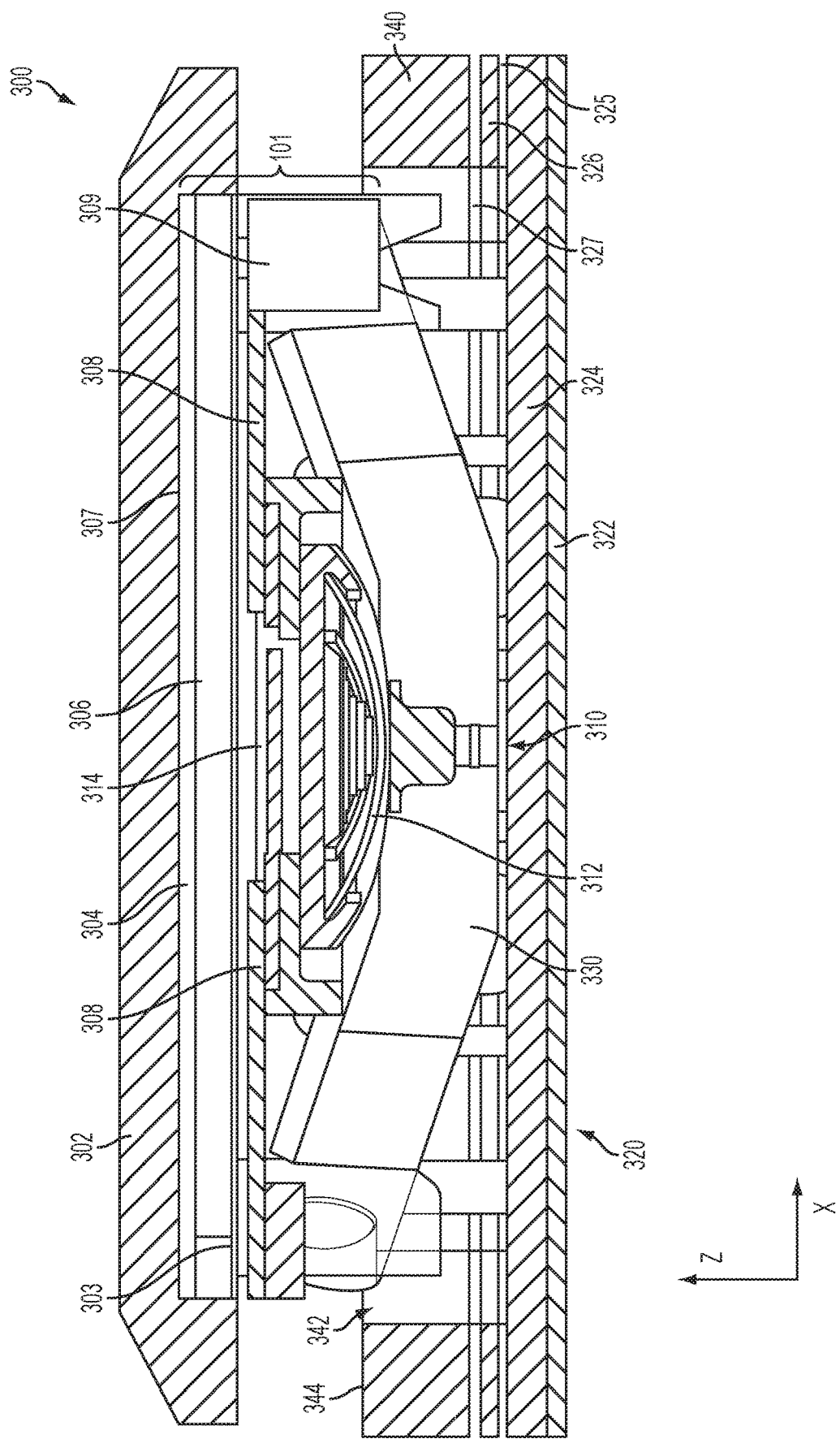
FIG. 10 is a cross-sectional view of the keystack 300 of FIG. 9 in accordance with some embodiments.

FIG. 10 is a cross-sectional view of keystack 300 taken along the line 10-10 of FIG. 9 in accordance with some embodiments. In particular, FIG. 10 depicts keycap 302 coupled to circuitry module 101 with an adhesive 307 (e.g., PSA). Circuitry module 101 can include one or more layers of image altering layers 304 coupled to display 306, display 306 and a backlight 303 operably coupled to flex 308, and flex tail 309 operably coupled between flex 308 and base 320. Additionally, FIG. 10 depicts a generic support mechanism 330 that may be layered between the upper portion of keystack 300 and base 320. FIG. 10 may correspond generally to FIG. 4 with the exception of circuitry module 101, which can include display 306 and image-altering layers 304 in the place of light source 206 and LGP 204. Backlight 303 may be included to illuminate display 306 in embodiments in which display 306 does not emit its own light (e.g., if display 306 is an LCD).

Image-altering layers 304 can include any suitable layers that alter the image generated by display 306. For instance, in some embodiments, image-altering layers 304 can include one or more optical filters (e.g., a polarizing filter) for clarifying, reducing glare, or otherwise improving the image generated by display 306. Additionally or alternatively, image-altering layers can include one or more filters that selectively block light emitted from display 306. For example image-altering layers 304 may include one or more filters with apertures that selectively allow light to strike the back side of keycap 302. Accordingly, such a filter may generate an illuminated glyph (e.g., glyph 305) visible on and/or through keycap 302.

Figure 11:
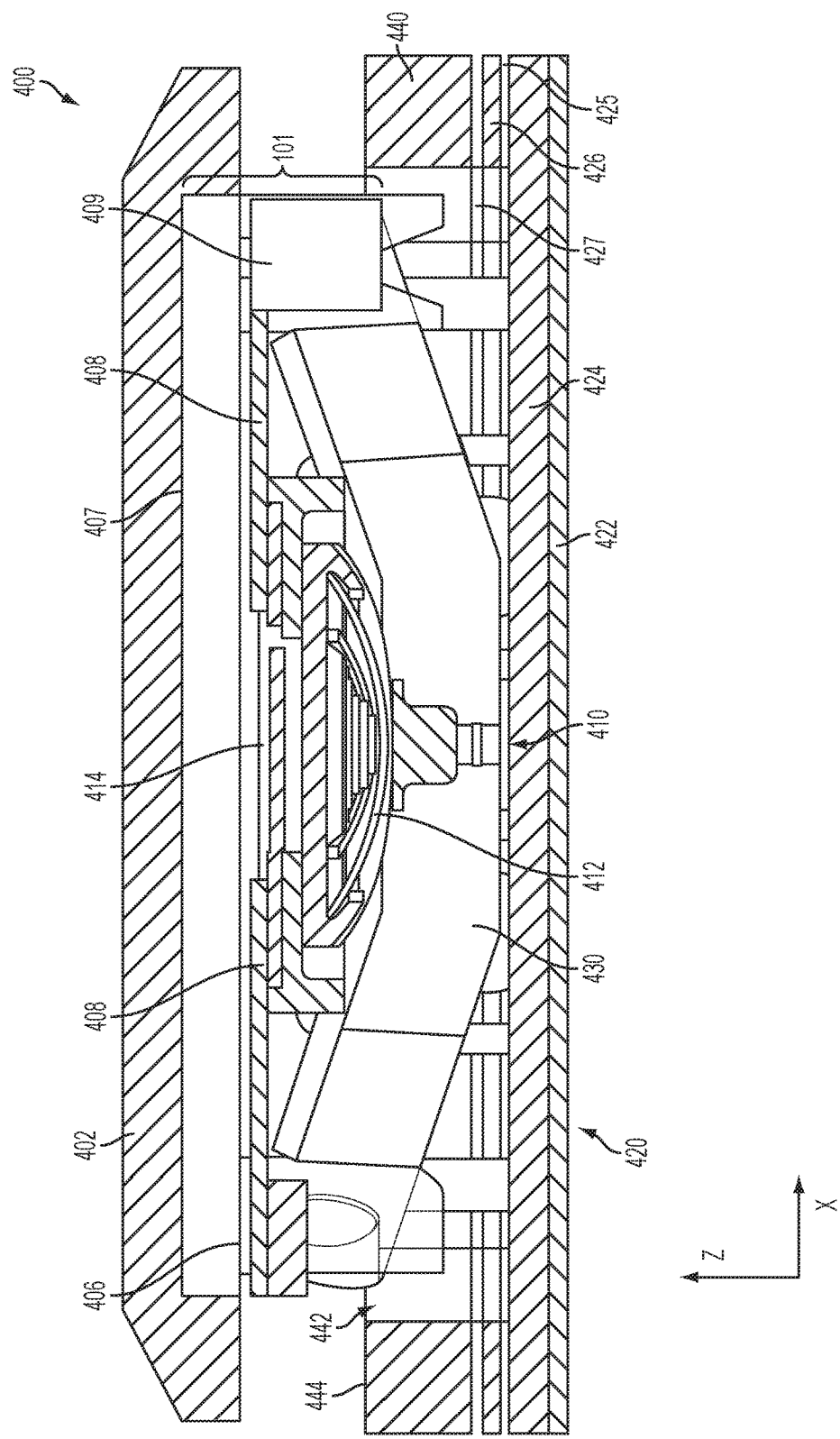
FIG. 11 is a cross-sectional view of a keystack in accordance with some embodiments.

FIG. 11 is a cross-sectional view of keystack 400 in accordance with some embodiments. In particular, FIG. 11 depicts keycap 402 coupled to circuitry module 101 with an adhesive 407 (e.g., PSA). Circuitry module 101 can include a capacitive touch sensor 406 operably coupled to flex 408 and flex tail 409 operably coupled between flex 408 and base 420. Additionally, FIG. 11 depicts a generic support mechanism 430 that may be layered between the upper portion of keystack 400 and base 420. FIG. 10 may correspond generally to FIG. 4 with the exception of circuitry module 101, which can include capacitive touch sensor 406 in the place of light source 206 and LGP 204.

Capacitive touch sensor 406 may provide a second input mode (distinct from the input generated when a user initiates a downward motion on keycap 402 (i.e., in the −z-direction). Thus, capacitive touch sensor 406 may be capable of sensing more subtle inputs including, for example, light touches on or swipes across keycap 402. The second input mode for each keystack 400 in a keyboard can greatly increase the number and type of inputs a user may send to an electronic device coupled to the keyboard including keystack 400. For example, capacitive touch sensors 406 across multiple keystacks 400 may facilitate single or multi-touch gestures across the keyboard. As just one example, swiping from right to left across a series of keys (e.g., the L-K-J keys) may initiate a 'turn 30 page forward' command to an eBook (e.g., iBooks made available by Apple Inc. of Cupertino, Calif.) application running on the electronic device.

According to some embodiments, capacitive touch sensor 406 may be combined with one or more other components of circuitry module 101. For example, capacitive touch sensor 406 may be layered under light source 206 and LGP 204 of FIG. 4. Accordingly, a capacitive touch sensor can be incorporated into the embodiments discussed above with respect to FIGS. 3-7. Similarly, capacitive touch sensor 406 may be incorporated into the embodiments disclosed above with respect to FIGS. 9 and 10, which include display 306. That is, display 306 could be a touch sensitive display.

According to some embodiments, display 306 may be an OLEO display that is grown on a glass substrate. The glass substrate, including display 306, may be sawn, diced, or otherwise cut into the shape of keycap 302. In these embodiments, display 306 may not need to be transferred from a first growth substrate to keycap 302.

Figure 12:
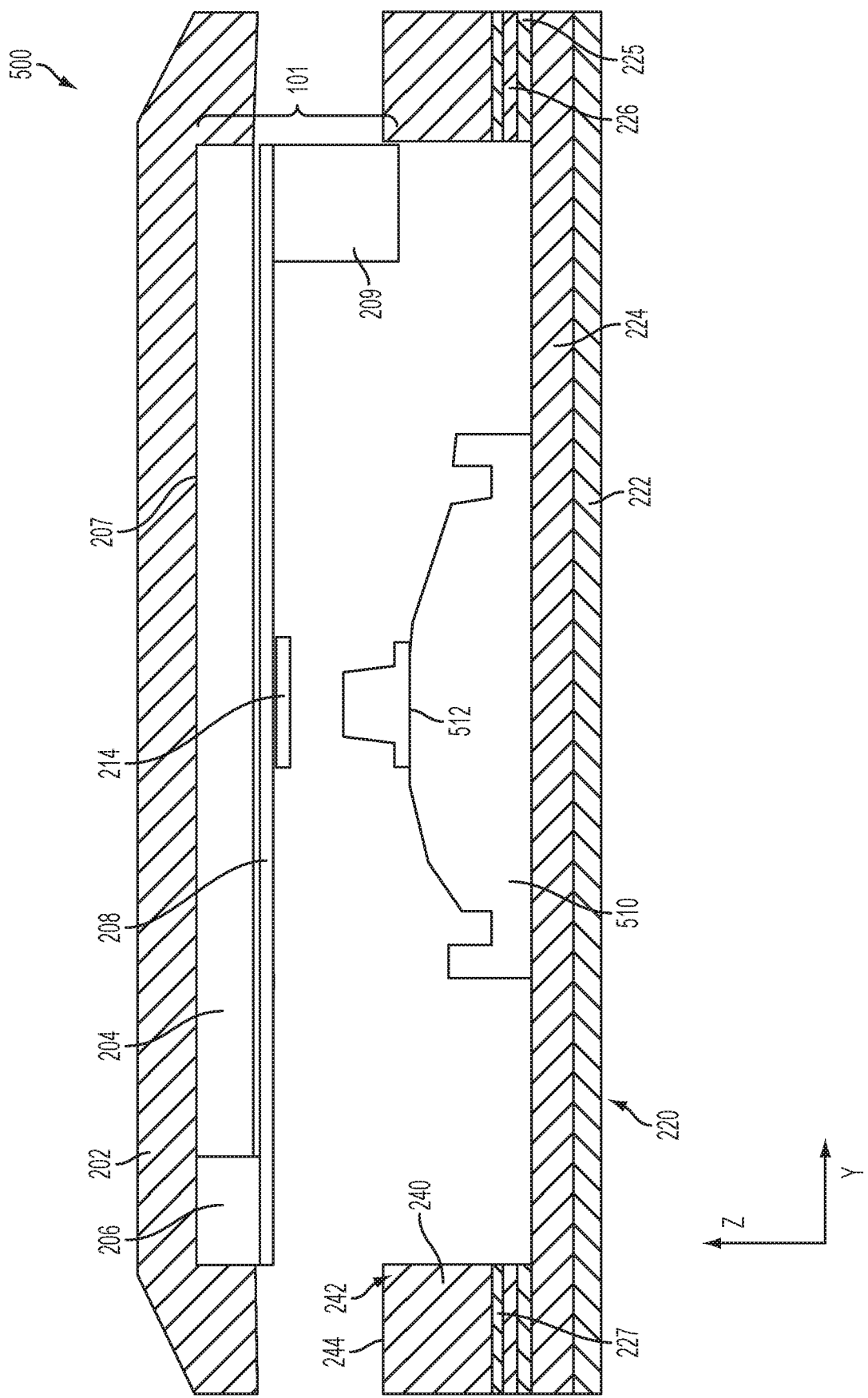
FIG. 12 is a cross-sectional view of a keystack in accordance with some embodiments.

FIG. 12 is a cross-sectional view of keystack 500 in accordance with some embodiments. Keystack 500 may be identical to keystack 200 of FIG. 4 with the exception that the switch is not a component of circuitry 101. As depicted in FIG. 12, switch 510 can be operably coupled to base 220. According to various, switch 510 may be operably coupled to base plate 220, feature plate 224, and/or bias plate 228 of base 220.

Switch 510 can include dome switch 512 and sensor membrane 214. As depicted, sensor membrane 214 is coupled to the bottom side of flex 208 and, therefore, it travels vertically when a user depresses keycap 202. In other embodiments, sensor membrane 214 may be mounted on a component of base 220 beneath dome switch 212. In these embodiments, additional conductive traces may be required on base 220 to transfer signals from sensor membrane 214 out of keystack 200.

Figure 13B:
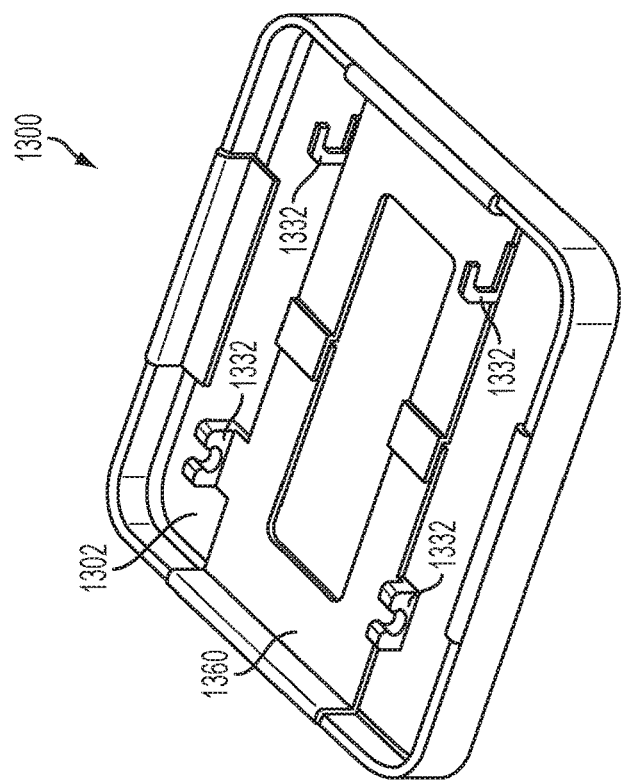
FIGS. 13A and 13B show perspective views of a portion of a key
Figure 13A:
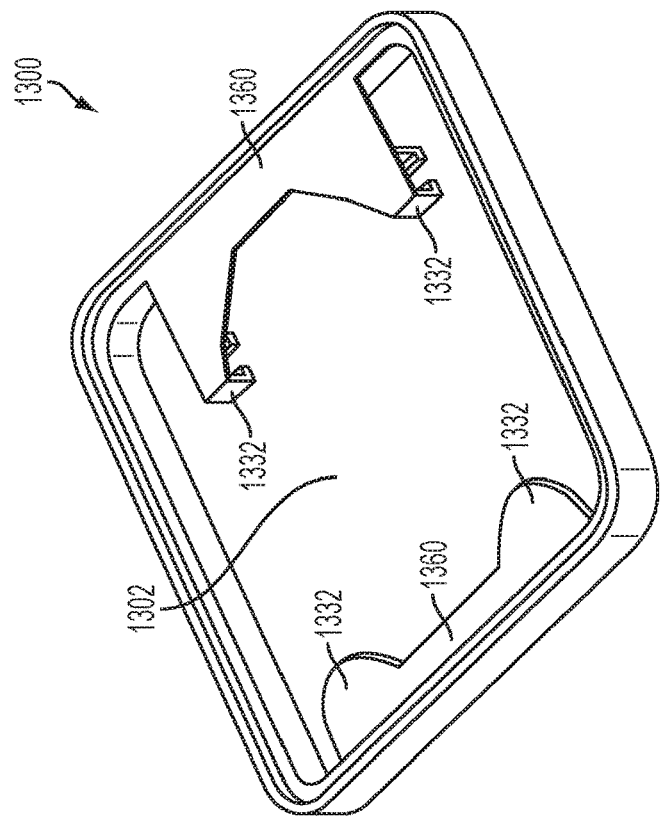

FIGS. 13A and 13B show perspective views of a portion of a key 1300 in accordance with some embodiments. Key 1300 can include keycap 1302 and substructure 1360. Keycap 1302 may correspond to keycap 202 of FIG. 3, for example. Accordingly, keycap 1302 may be formed from a rigid and durable material such as glass, for example. However, other materials, such as plastics or metals may be substituted to form keycap 1302 without straying from the spirit of the embodiments disclosed herein.

Substructure 1360 may be any suitable structure that can be attached to keycap 1302 to facilitate the coupling of keycap 1302 to a support mechanism (e.g., support mechanism 130 of FIG. 4). Substructure 1360 can form a perimeter around and fixedly retain keycap 1302. The back side of key 1300 may include anchoring features 1332 for engaging anchoring mechanisms of the support mechanism. Anchoring features 1332 may correspond to anchoring features 232 of FIG. 6, for example.

Figure 14:
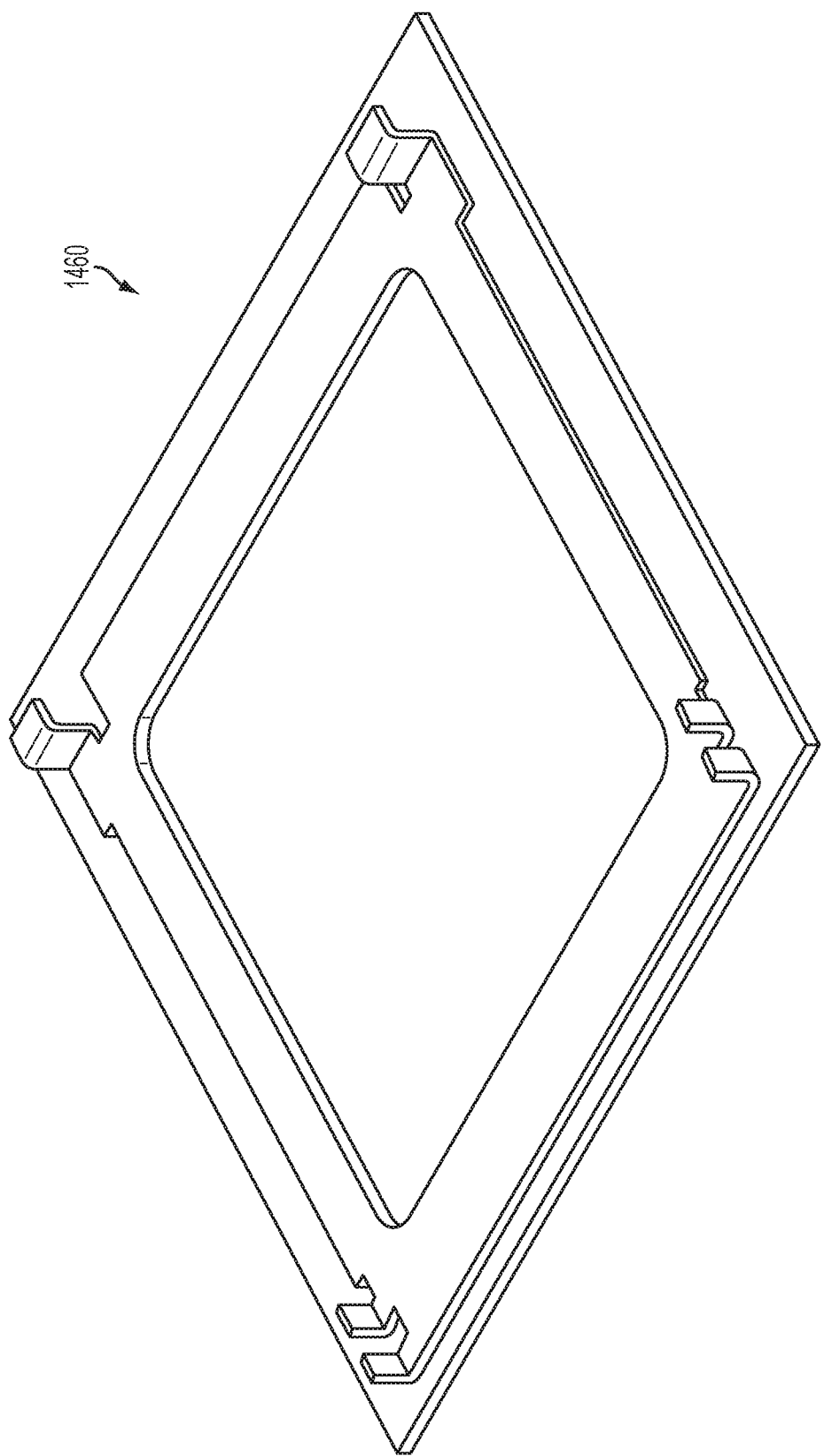
FIGS. 14 and 15 show perspective views of substructures for a keycap in accordance with some embodiments.
Figure 15:
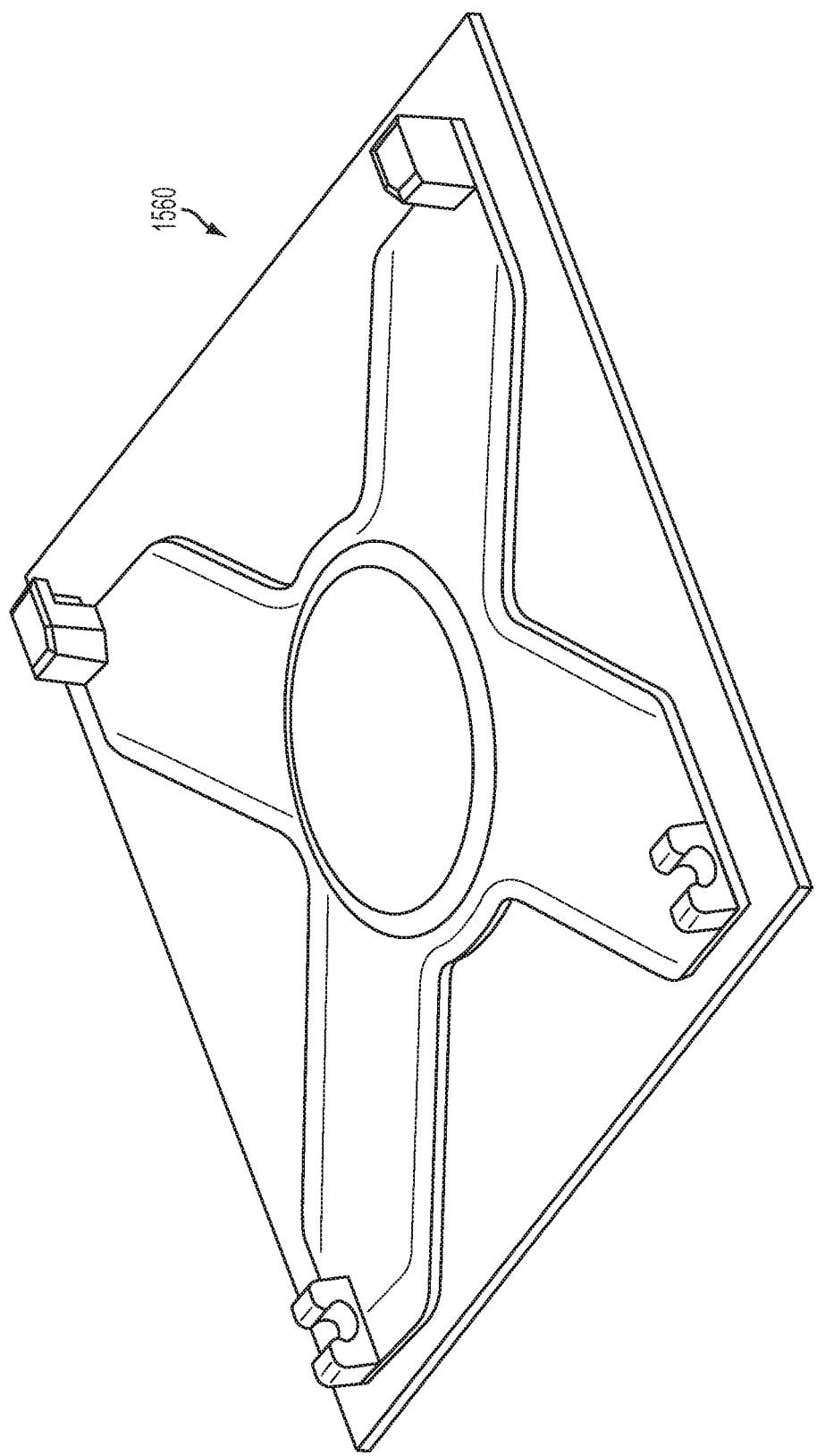

FIGS. 14 and 15 show perspective views of substructures 1460 and 1560 in accordance with some embodiments. Substructures 1460 and 1560 may be similar to substructure 1360 except that substructures 1460 and 1560 may be affixed directly to a back side of a keycap (e.g., keycap 202 of FIG. 3) with, for example, and adhesive such as PSA. In some embodiments, substructures 1460 and 1560 may correspond to LGP 204 of FIG. 6. Substructures 1360, 1460, and 1560 may be formed from any suitable materials including, for example, metals (e.g., stainless steel) or plastics.

While there have been described Systems and methods for providing multi-functional keyboard assemblies, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The described embodiments of the invention are presented for the purpose of illustration and not of limitation.

What is claimed is:

1. A keyboard input assembly, comprising:
a base layer; and
a set of keys, wherein each key of the set of keys comprises:
a keycap;
a support mechanism positioned between the keycap and the base layer; and
a collapsible switch having a dome portion positioned between the keycap and the base layer, wherein the dome portion comprises a convex outer surface facing the base layer;
wherein the support mechanism is a butterfly-type support mechanism having a central opening within which the dome portion is positioned, wherein the convex outer surface is downward-facing, and wherein the dome portion is configured to collapse upon movement of the key relative to the base layer and to close an electrical circuit.

2. A keyboard input assembly, comprising:
a base layer;
a set of keys, wherein each key of the set of keys comprises:
a keycap;
a support mechanism positioned between the keycap and the base layer, the support mechanism comprising a butterfly mechanism or a scissor mechanism;
a compressible dome switch having a dome portion positioned between the keycap and the base layer, wherein the dome portion comprises a convex outer surface facing the base layer.

3. The keyboard input assembly of claim 2, wherein the convex outer surface is positioned within an opening of the support mechanism.

4. The keyboard input assembly of claim 2, wherein the collapsible switch is electrically connected to the base layer.

5. The keyboard input assembly of claim 2, wherein a sensor membrane is positioned between the dome portion and the keycap.

6. The keyboard input assembly of claim 2, wherein the compressible dome switch is coupled to a flex.

7. A key mechanism, comprising:
a frame;
a keycap;
a support mechanism configured to stabilize vertical movement of the keycap relative to the frame;
a switch positioned between the keycap and the frame; and
a sensor membrane layer having a portion positioned between the switch and the keycap at a location above the switch, the sensor membrane layer configured to move with the keycap relative to the frame and to detect a change in position of the switch relative to the frame.

8. The key mechanism of claim 7, wherein the sensor membrane layer comprises a circuit, the circuit being closable in response to movement of the switch.

9. The key mechanism of claim 7, wherein the switch is configured to provide increased resistance, a click, or a vibration using a compressible dome in response to movement of the keycap relative to the frame.

10. The key mechanism of claim 7, wherein the switch extends through an opening in the support mechanism.

11. The key mechanism of claim 7, further comprising a flex coupled to the keycap, the sensor membrane layer being coupled to the flex.

12. The key mechanism of claim 11, wherein the flex comprises a first conductive portion and the sensor membrane layer comprises a second conductive portion, the first and second conductive portions being in electrical communication with each other.

13. A keyboard, comprising:
a base;
a keycap;
a support mechanism coupled to the base and coupled to the keycap;
a switch positioned between the keycap and the base, the switch being compressible in response to movement of the keycap relative to the base;
a flexible membrane having a first portion positioned between the switch and the keycap, the flexible membrane being coupled to the keycap, the flexible membrane comprising a conductive material configured to route electrical signals through the flexible membrane; and
the flexible membrane having a second portion positioned between a second switch and a second keycap.

14. The keyboard of claim 13, further comprising:
an electronic device in electrical communication with the conductive material; and
a flexible tail positioned electrically between the flexible membrane and the electronic device;
wherein the flexible membrane is compressible to close a circuit and transfer a signal to the electronic device.

15. The keyboard of claim 13, wherein the flexible membrane is bendable in response to movement of the keycap relative to the base.

16. The keyboard of claim 13, wherein the switch is closable to indicate a change in position of the keycap relative to the base.

17. The keyboard of claim 13, wherein the switch is closable to complete a circuit, the circuit including the conductive material of the flexible membrane.

18. The keyboard of claim 13, wherein the flexible membrane is movable relative to the base.

19. The keyboard of claim 13, wherein the switch is coupled to the flexible membrane.

20. The keyboard of claim 13, wherein the flexible membrane comprises a tail extending toward the base.

21. The keyboard of claim 20, wherein the tail electrically connects the flexible membrane to the base.

* * * * *